United States Patent [19]
Larson

[11] Patent Number: 5,821,987
[45] Date of Patent: *Oct. 13, 1998

[54] VIDEOPHONE FOR SIMULTANEOUS AUDIO AND VIDEO COMMUNICATION VIA A STANDARD TELEPHONE LINE

[76] Inventor: Craig R. Larson, 529 Chestnut St., Santa Cruz, Calif. 95060

[ * ] Notice: The term of this patent shall not extend beyond the expiration date of Pat. No. 5,541,640.

[21] Appl. No.: 808,062

[22] Filed: Feb. 28, 1997

Related U.S. Application Data

[63] Continuation of Ser. No. 681,938, Jul. 29, 1996, abandoned, which is a continuation of Ser. No. 424,729, Apr. 19, 1995, Pat. No. 5,541,640, which is a continuation of Ser. No. 330,219, Oct. 27, 1994, abandoned, which is a continuation of Ser. No. 243,529, May 13, 1994, abandoned, which is a continuation of Ser. No. 903,231, Jun. 23, 1992, abandoned.

[51] Int. Cl.$^6$ .............................. H04M 11/00; H04N 7/12
[52] U.S. Cl. ........................................... 348/19; 379/93.17
[58] Field of Search .................................. 379/96–99, 93, 379/93.17, 93.21, 93.22, 93.26, 93.28, 93.01, 93.37; 348/14, 16–19, 22, 384; H04N 7/10, 7/12, 7/14

[56] References Cited

U.S. PATENT DOCUMENTS

| | | |
|---|---|---|
| 3,970,792 | 7/1976 | Benham et al. . |
| 4,827,339 | 5/1989 | Wada et al. . |
| 4,849,811 | 7/1989 | Kleinerman . |
| 4,985,911 | 1/1991 | Emmons et al. . |
| 5,063,440 | 11/1991 | Hong . |
| 5,164,980 | 11/1992 | Bush et al. . |
| 5,202,957 | 4/1993 | Serrao . |
| 5,204,893 | 4/1993 | Choi et al. . |
| 5,541,640 | 7/1996 | Larson .................................... 379/96 |

*Primary Examiner*—Wing F. Chan
*Attorney, Agent, or Firm*—William C. Milks, III

[57] ABSTRACT

A videophone includes a video camera for transducing and digitizing images at a station and connected to a video processor for compressing and encoding the digitized images into video data. The videophone also includes an audio transducer and digitizer connected to an audio processor synchronized with the video processor for compressing and encoding digitized sound. The video and audio processors are connected to a communication controller for formatting and transmitting the video data bundled with the audio data via a standard bidirectional (full duplex) telephone line in the form of a twisted pair. The communication controller can also receive and then unformat and unbundle audio and video data, and the video processor and audio processor can decode and decompress the received video and audio data, and the station further includes a display connected to the video processor for reproducing images and an electroacoustic transducer connected to the audio processor for reproducing sounds transmitted by another station. Rather than format and transmit only delayed or partial changed video data when the image changes significantly, the large amount of changed video data being stored is overwritten when the amount reaches a predetermined level, and new video data corresponding to the present appearance of the image is compressed, encoded, bundled with associated audio data, formatted, and transmitted. The image reproduced at the receiving station therefore jumps ahead to an updated image without intervening blurred images. Audio and video data can also be selectively stored and subsequently played back and/or transmitted to another station.

20 Claims, 18 Drawing Sheets

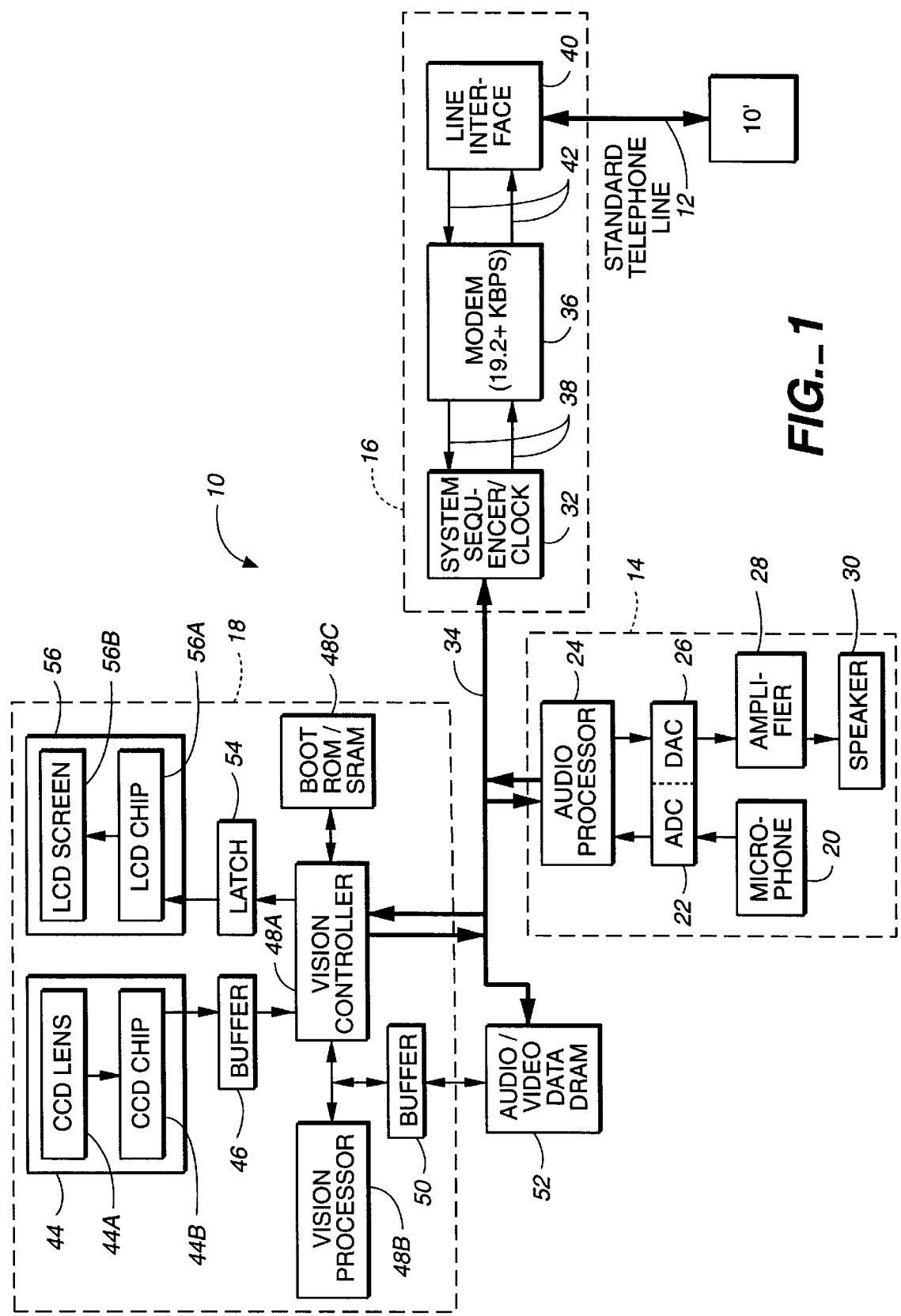
FIG._1

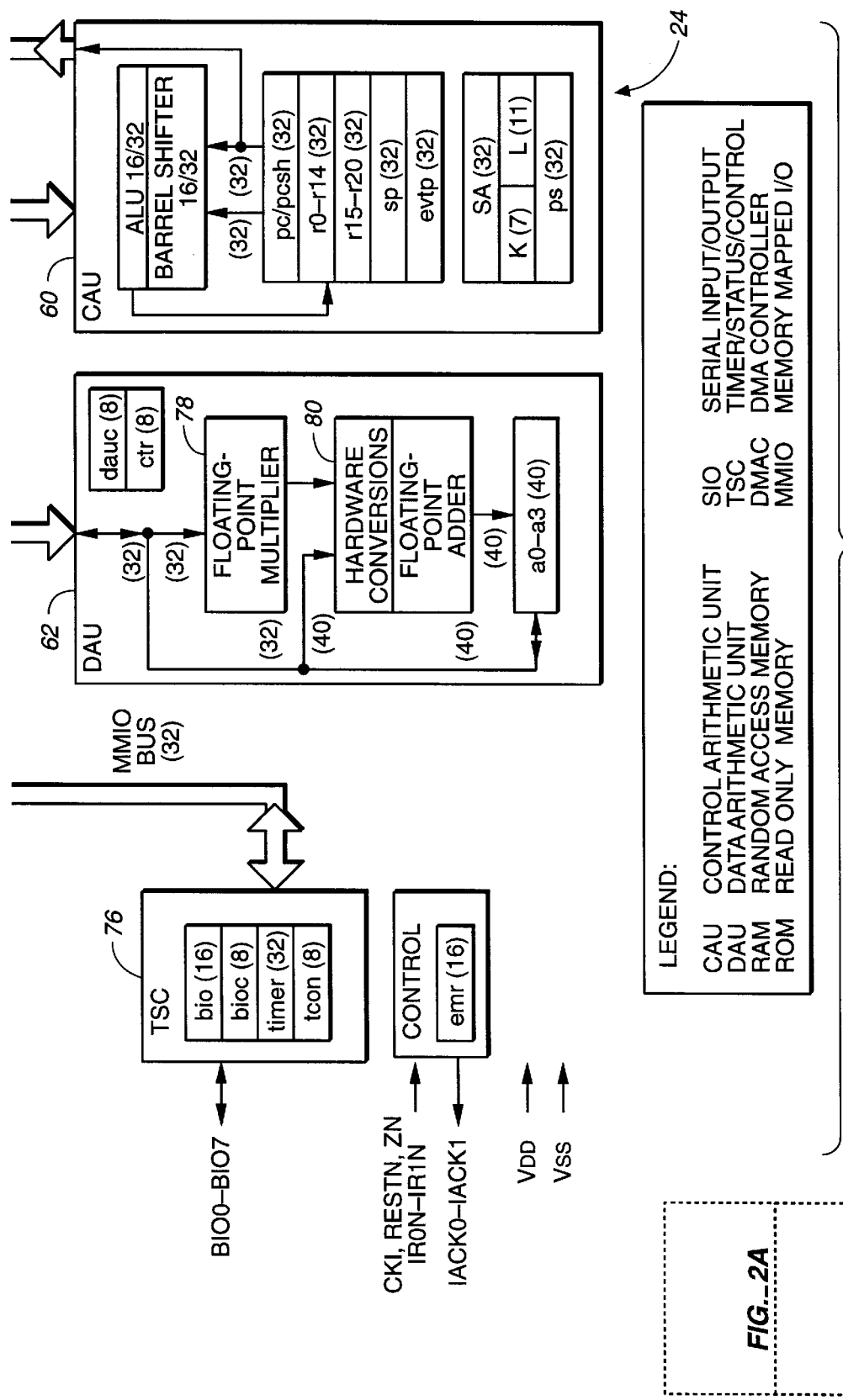

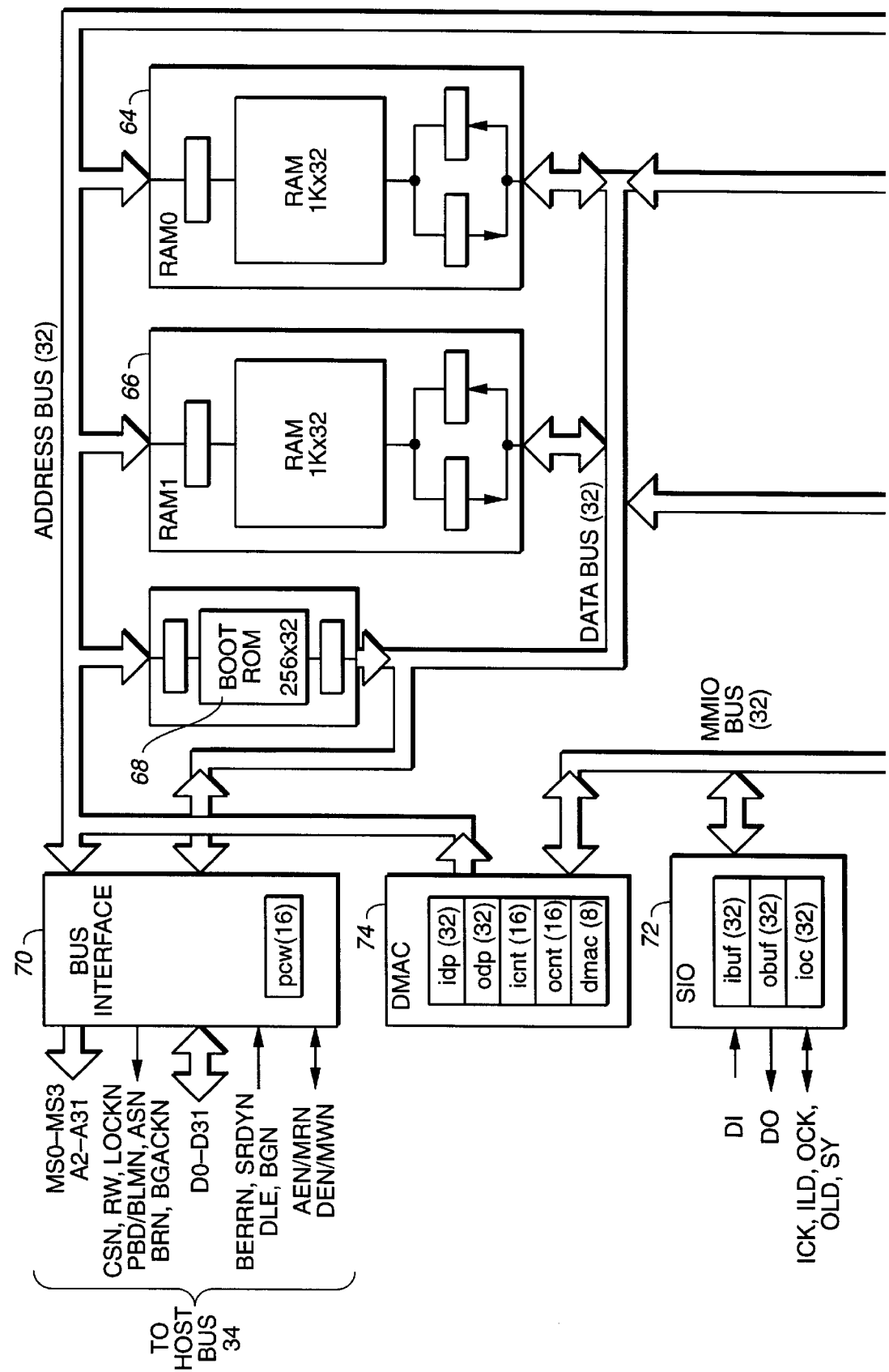
FIG._2A

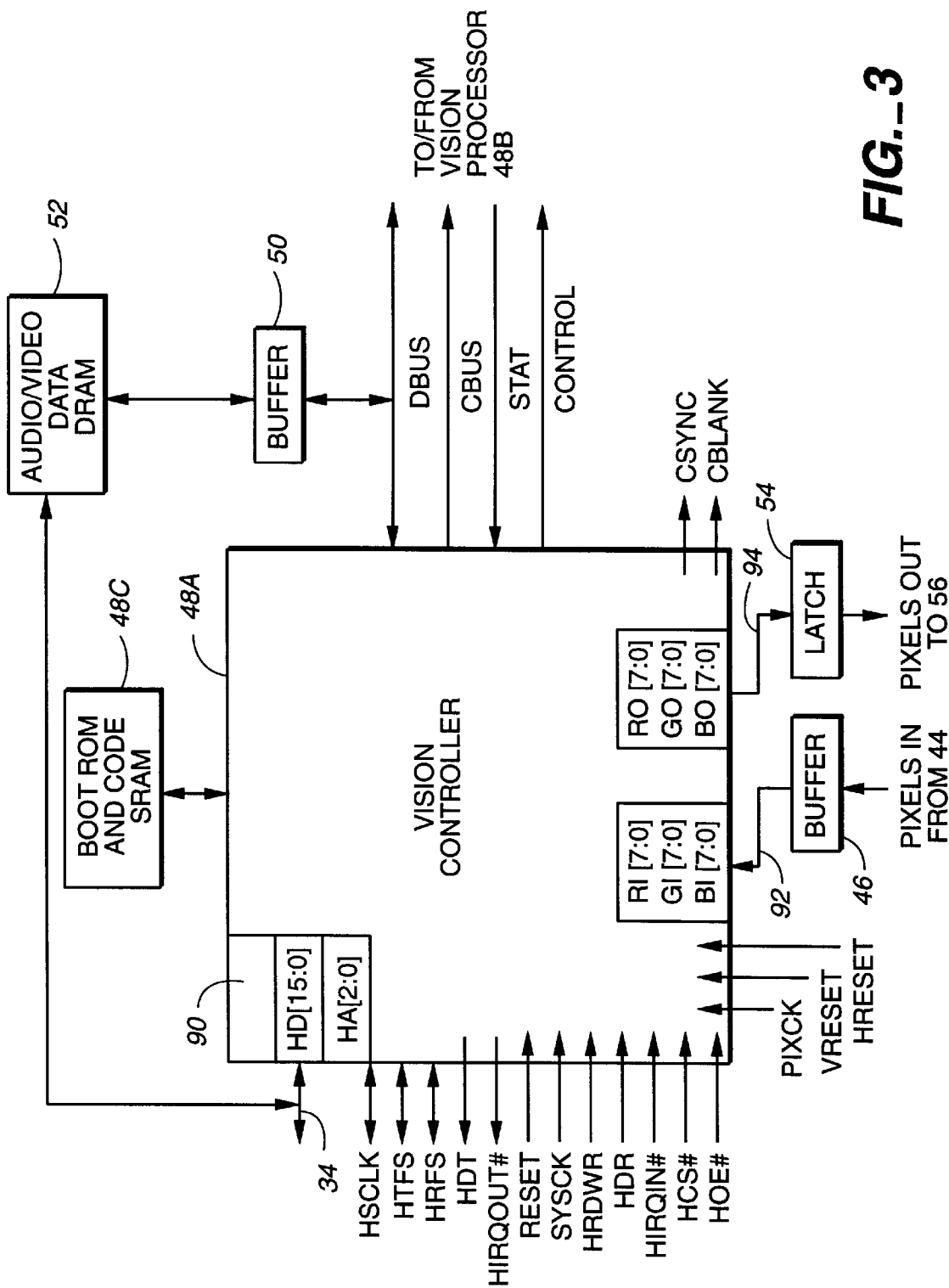
FIG._3

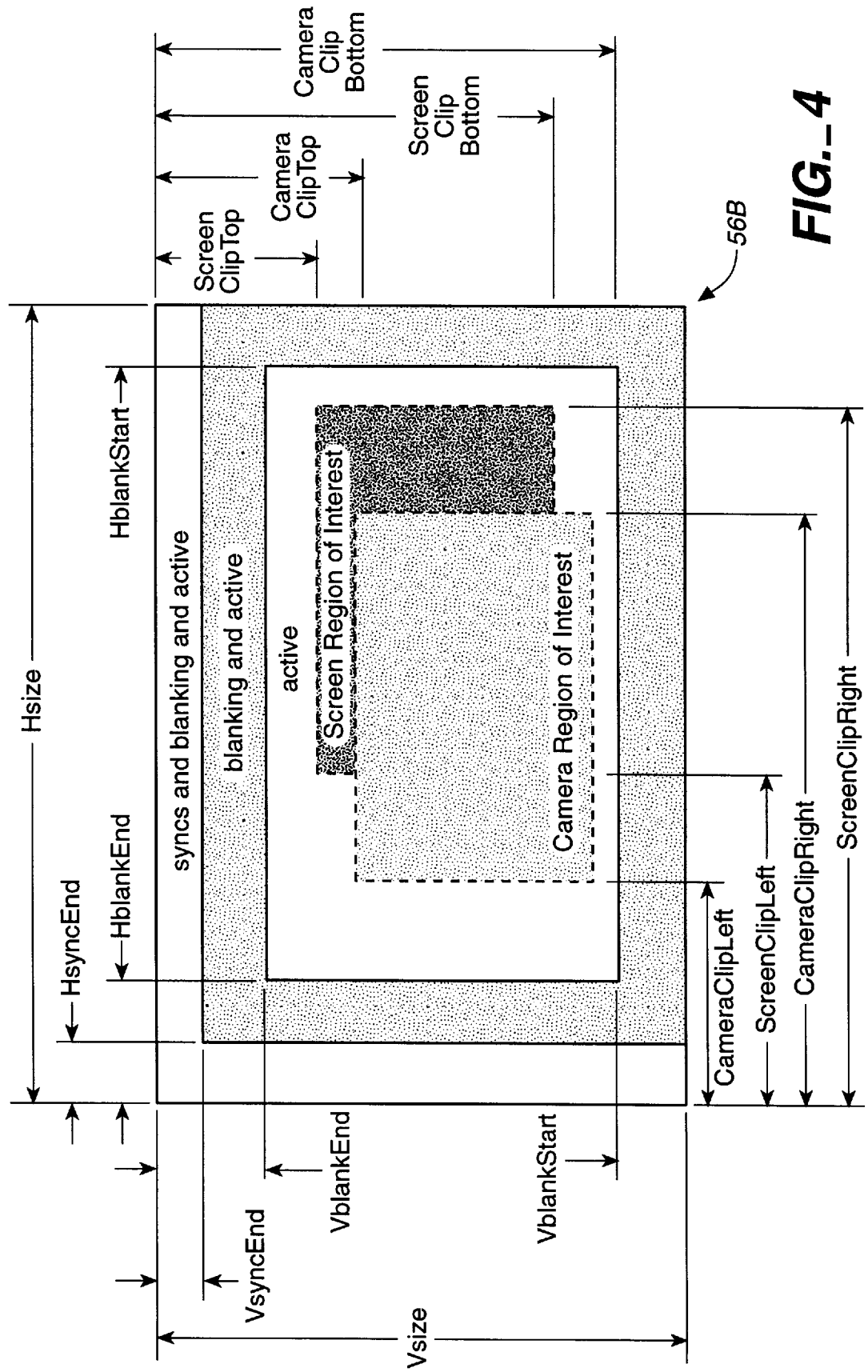
FIG._4

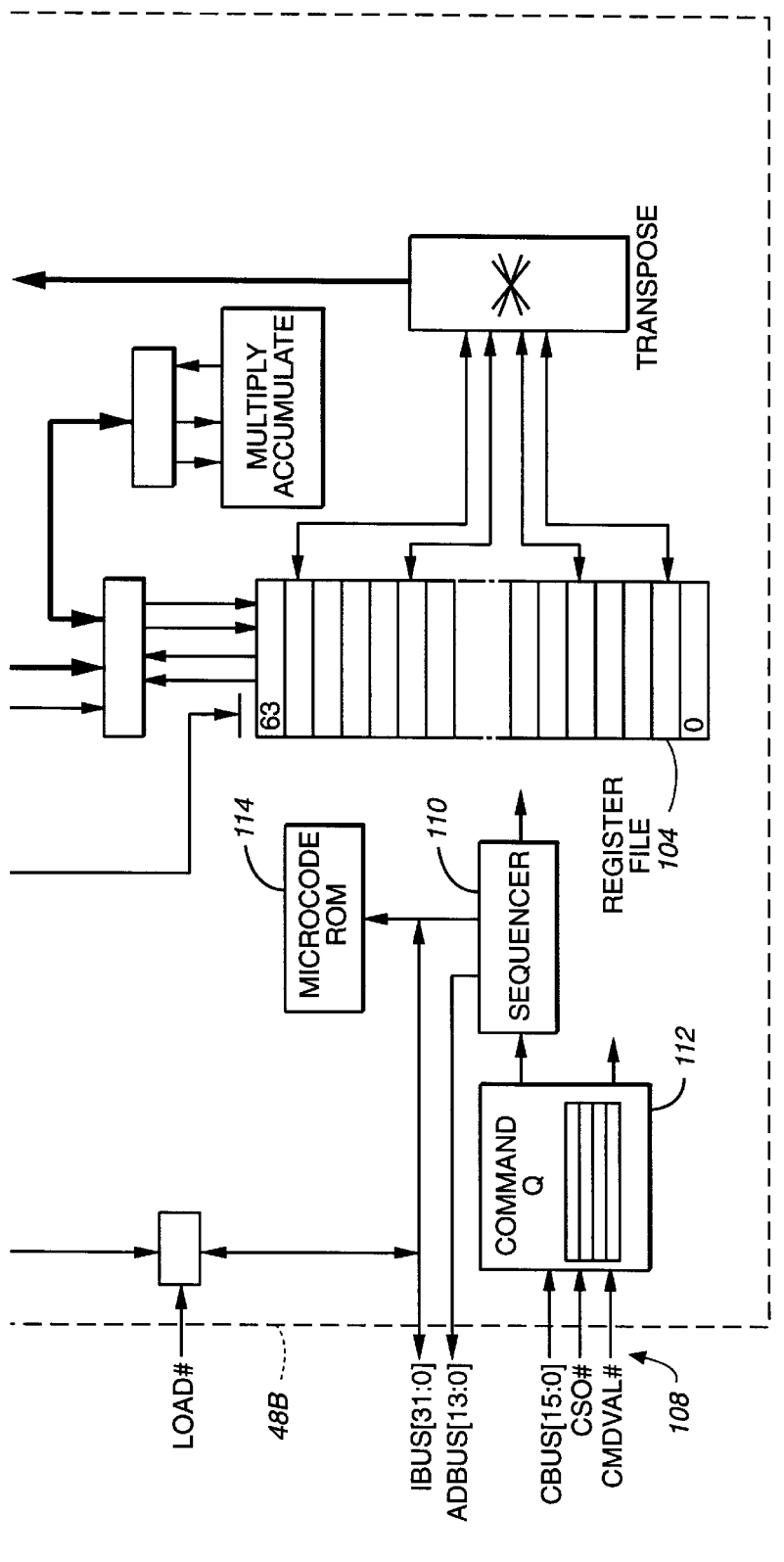

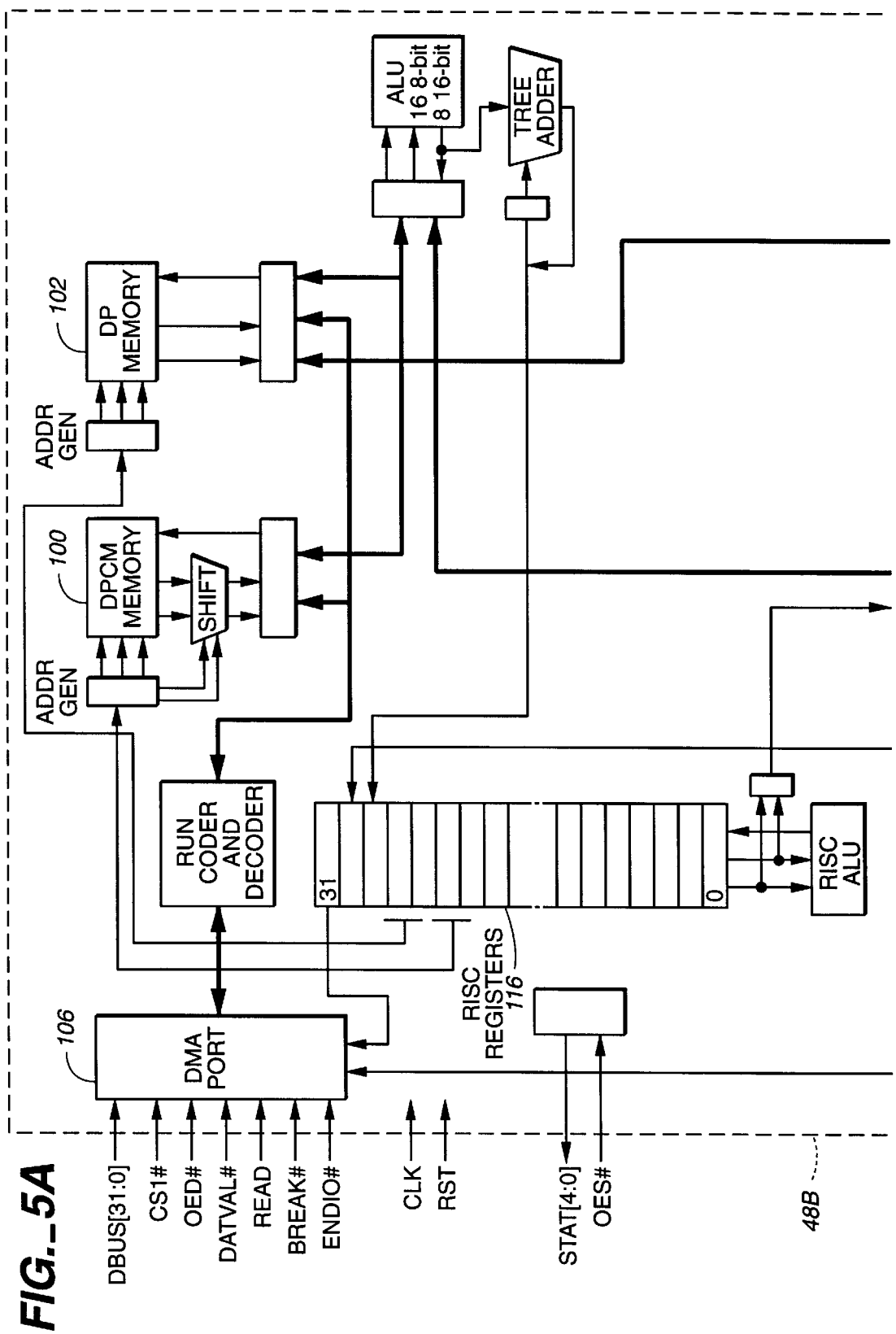
FIG._5A

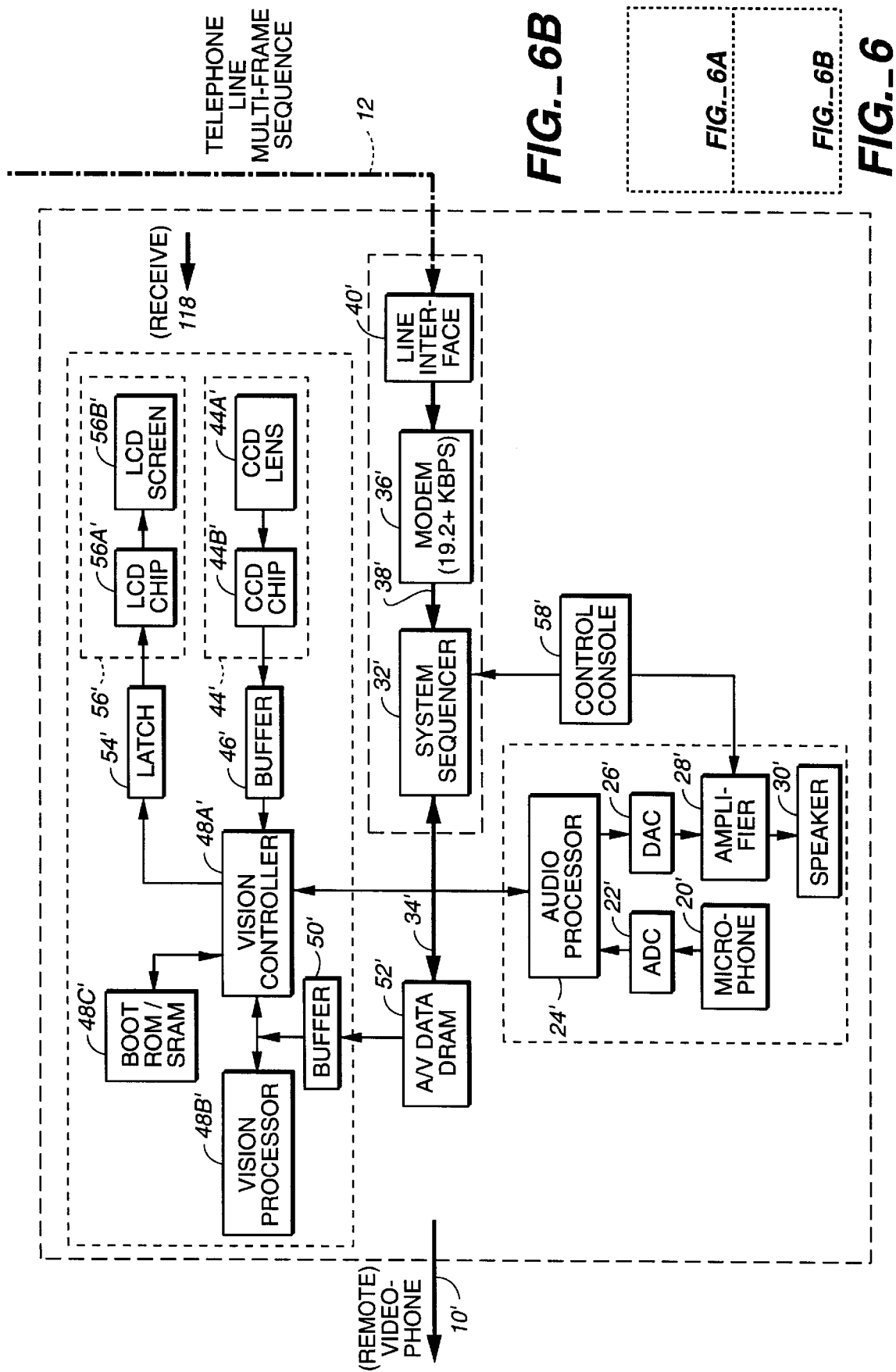
FIG._6B
FIG._6
| FIG._6A | FIG._6B |

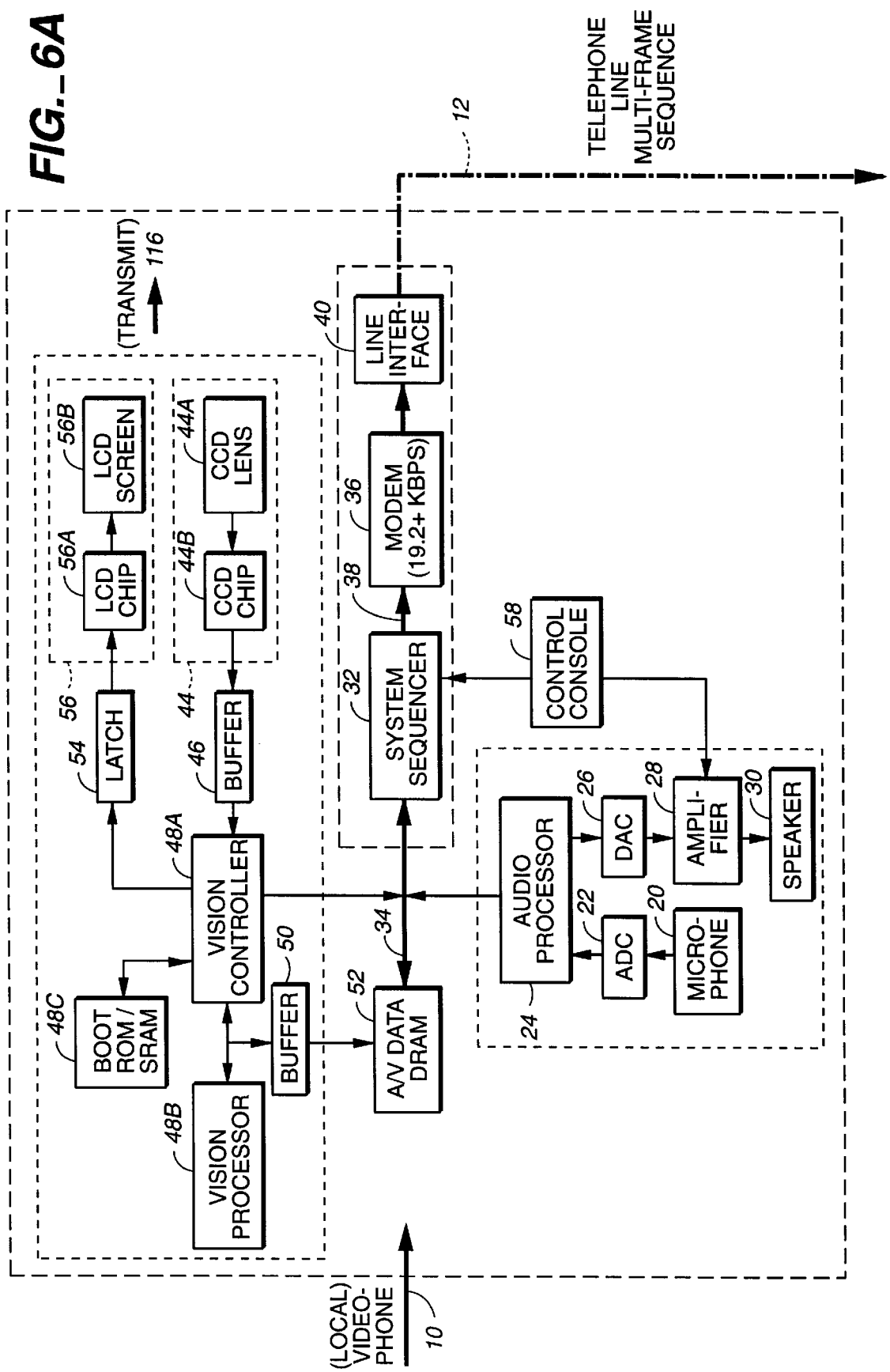

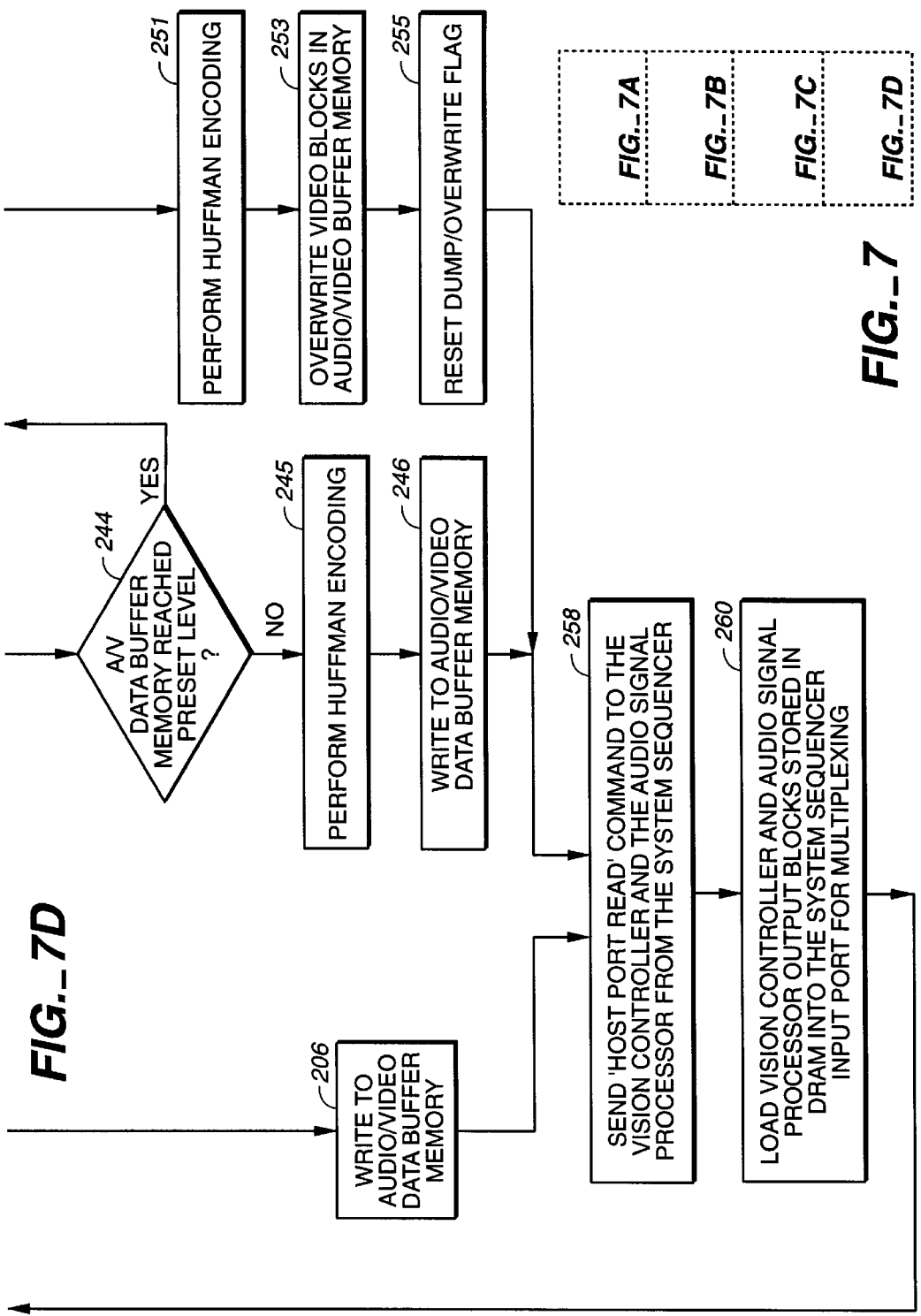

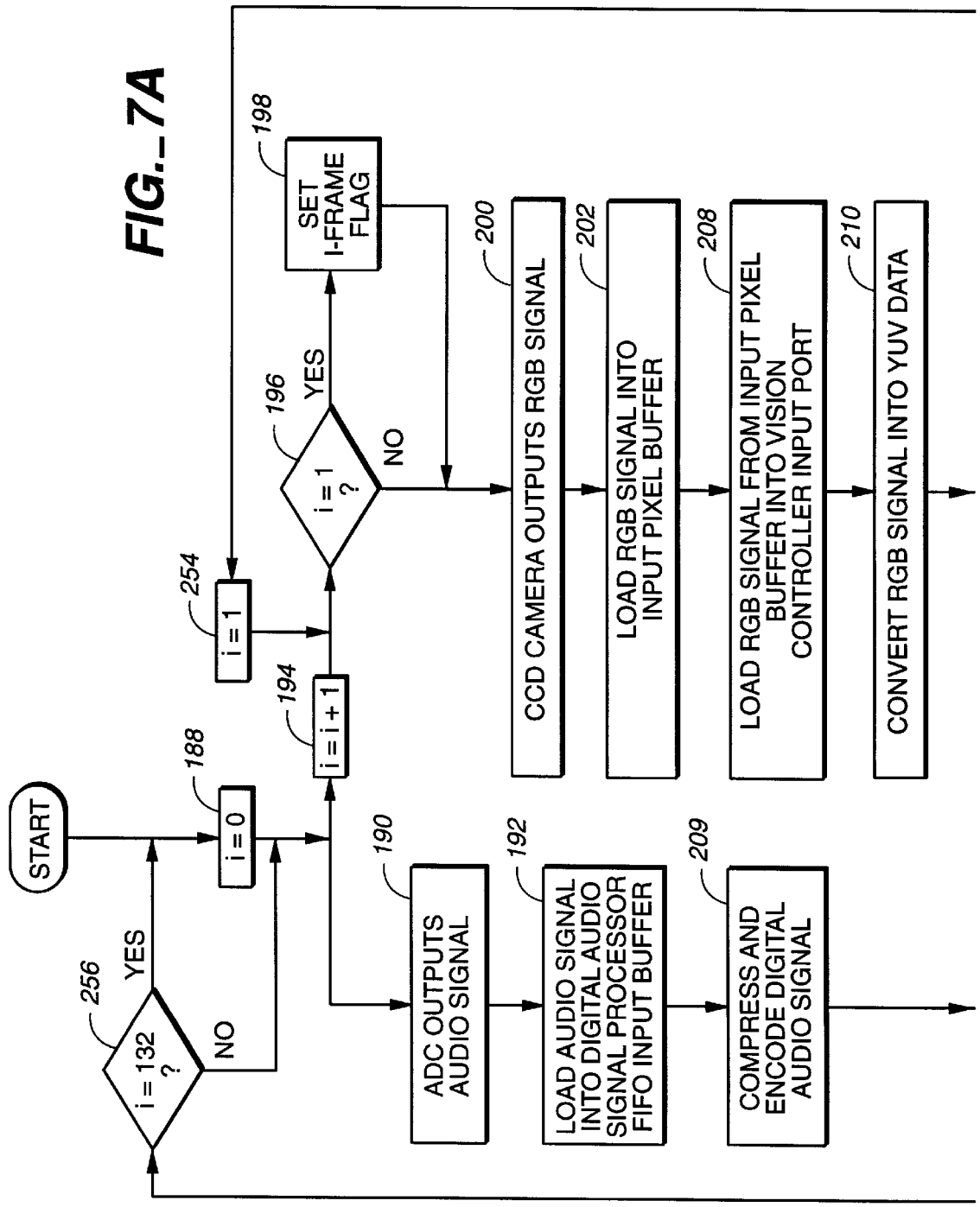
FIG._7A

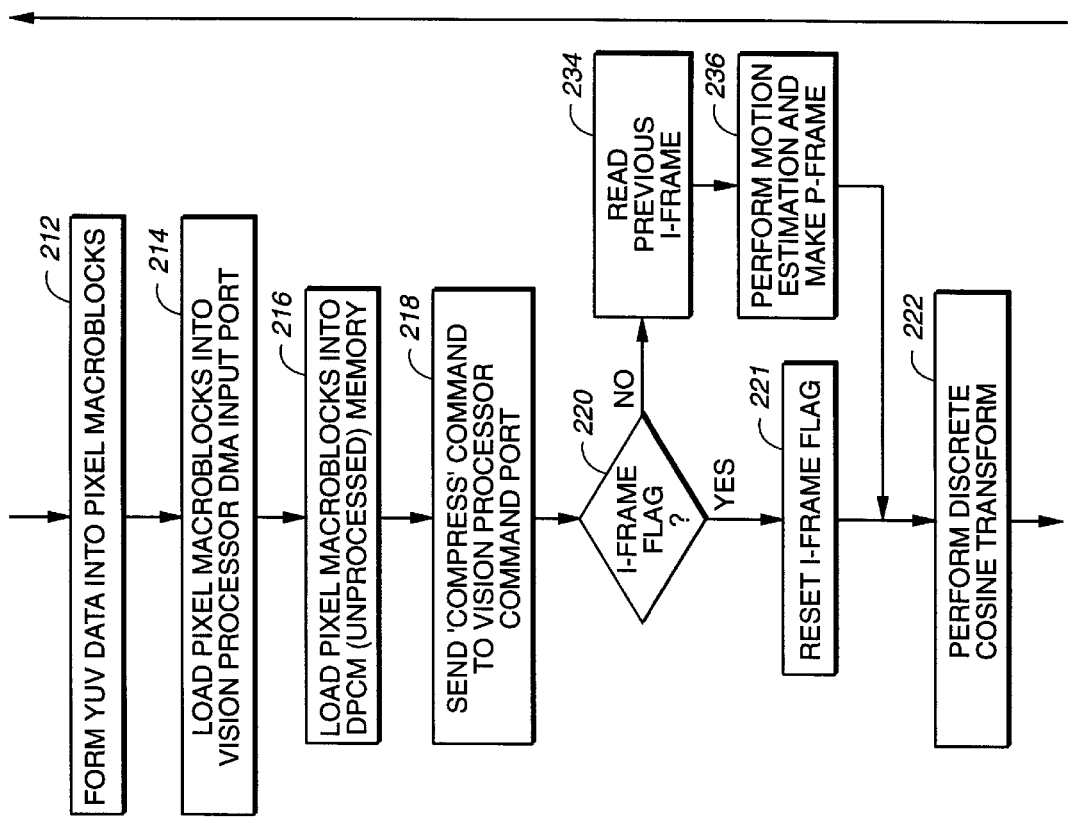
FIG._7B

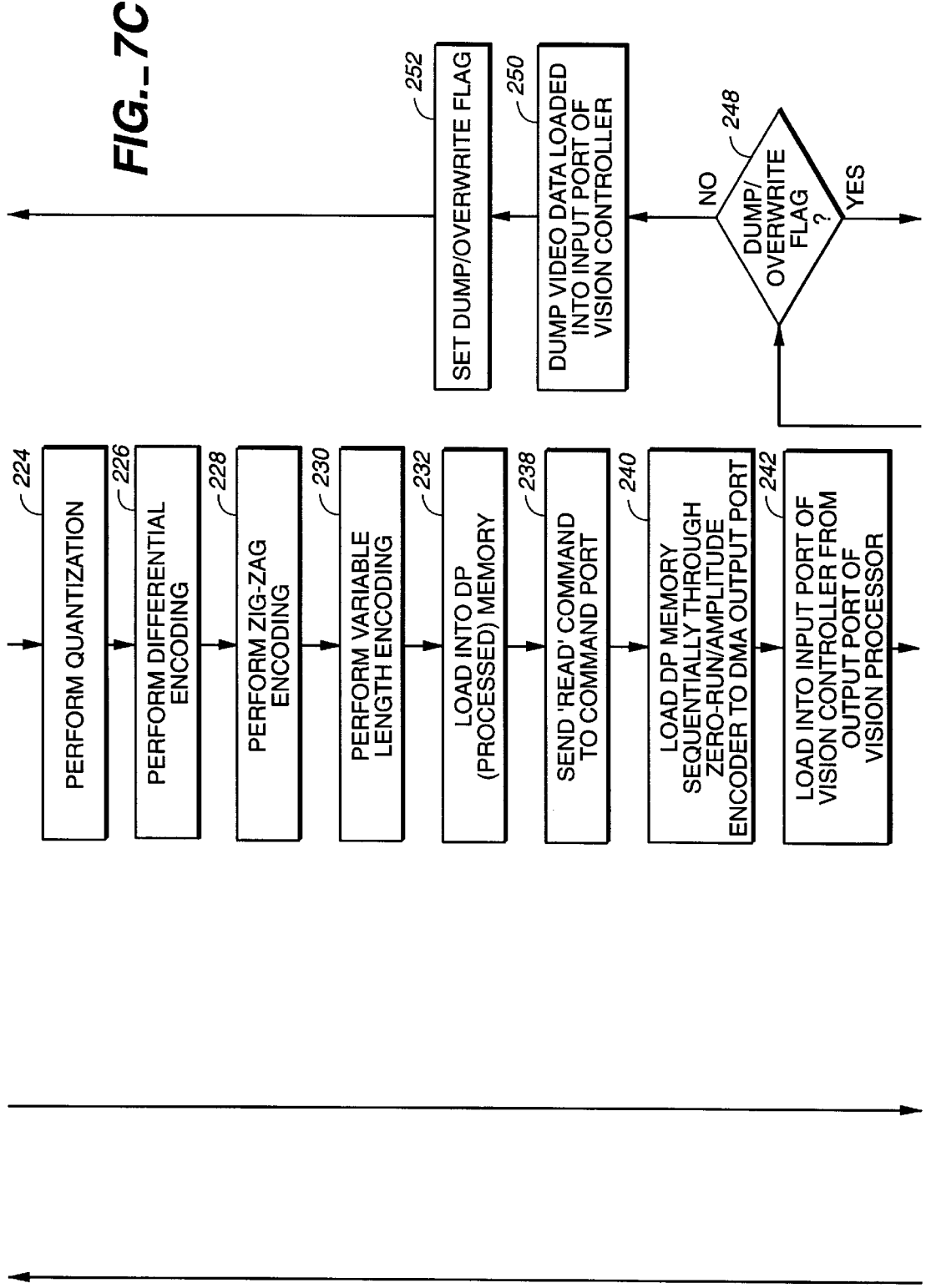

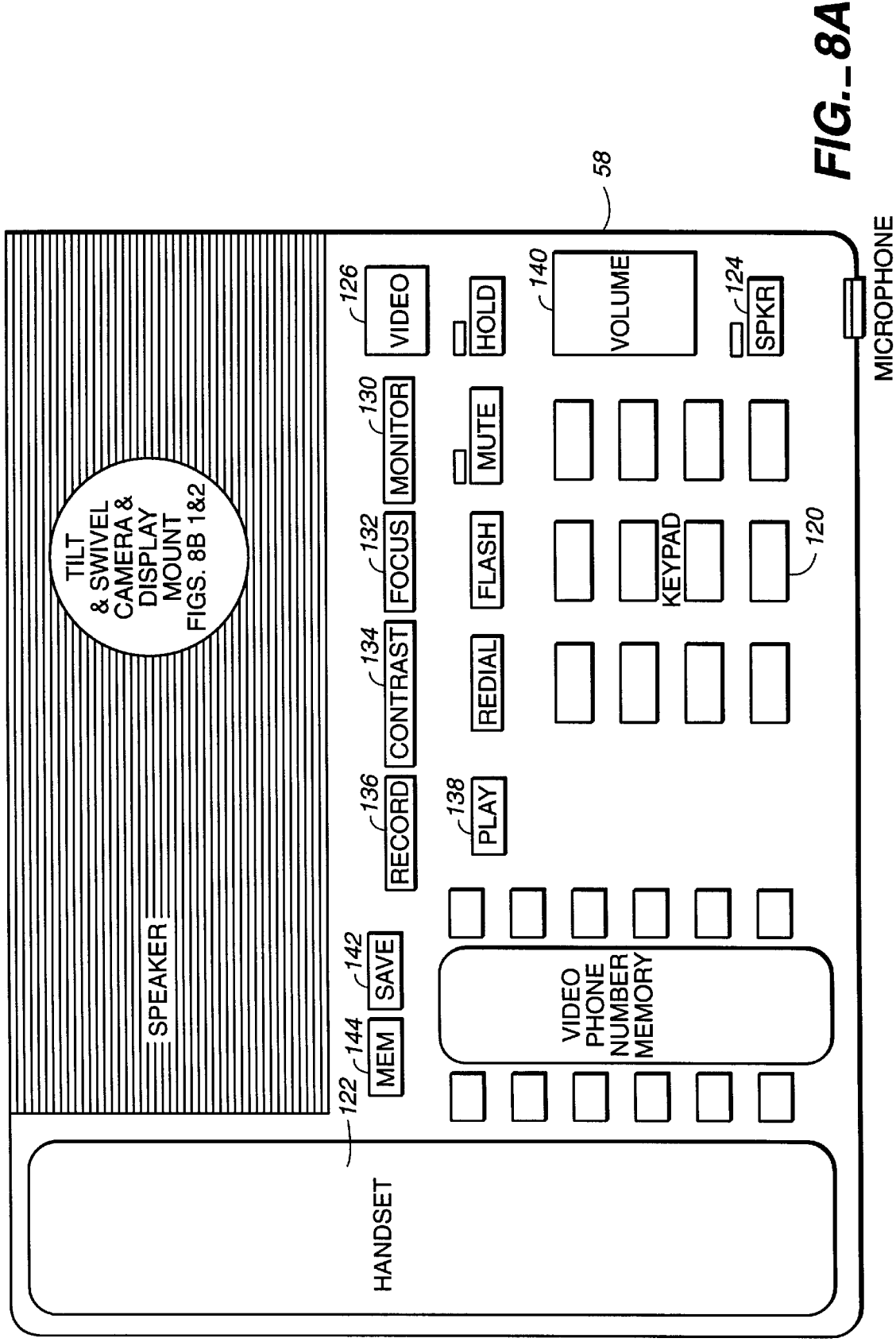

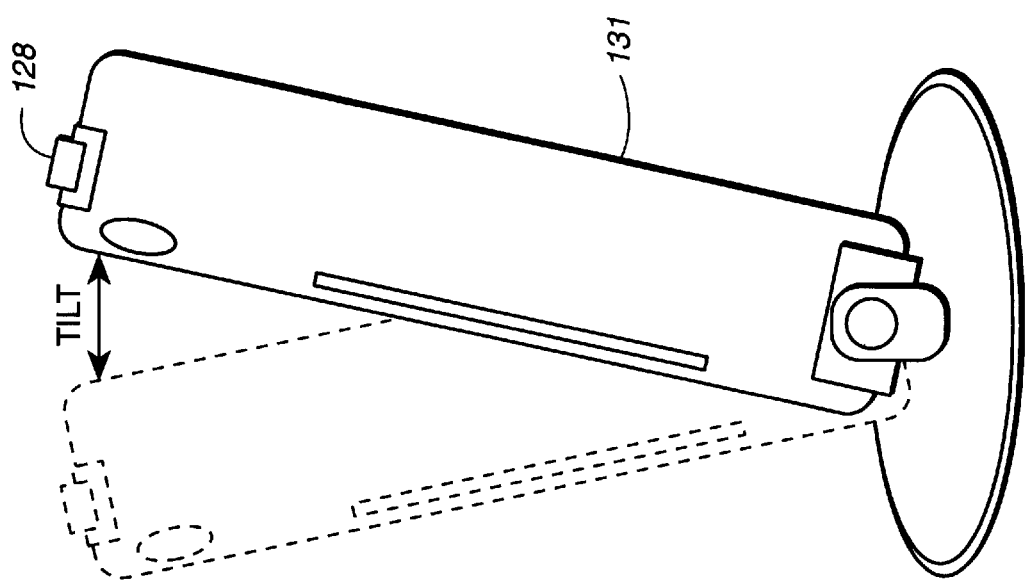
FIG._8B2
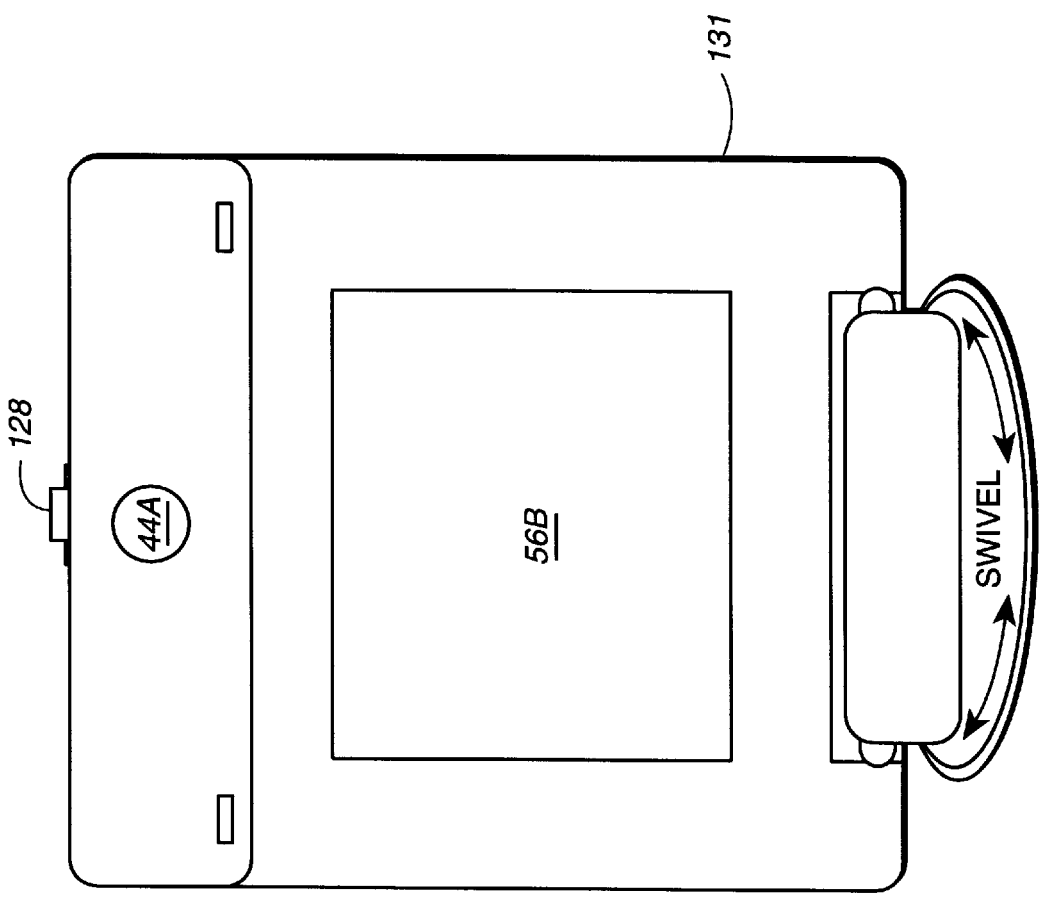
FIG._8B1

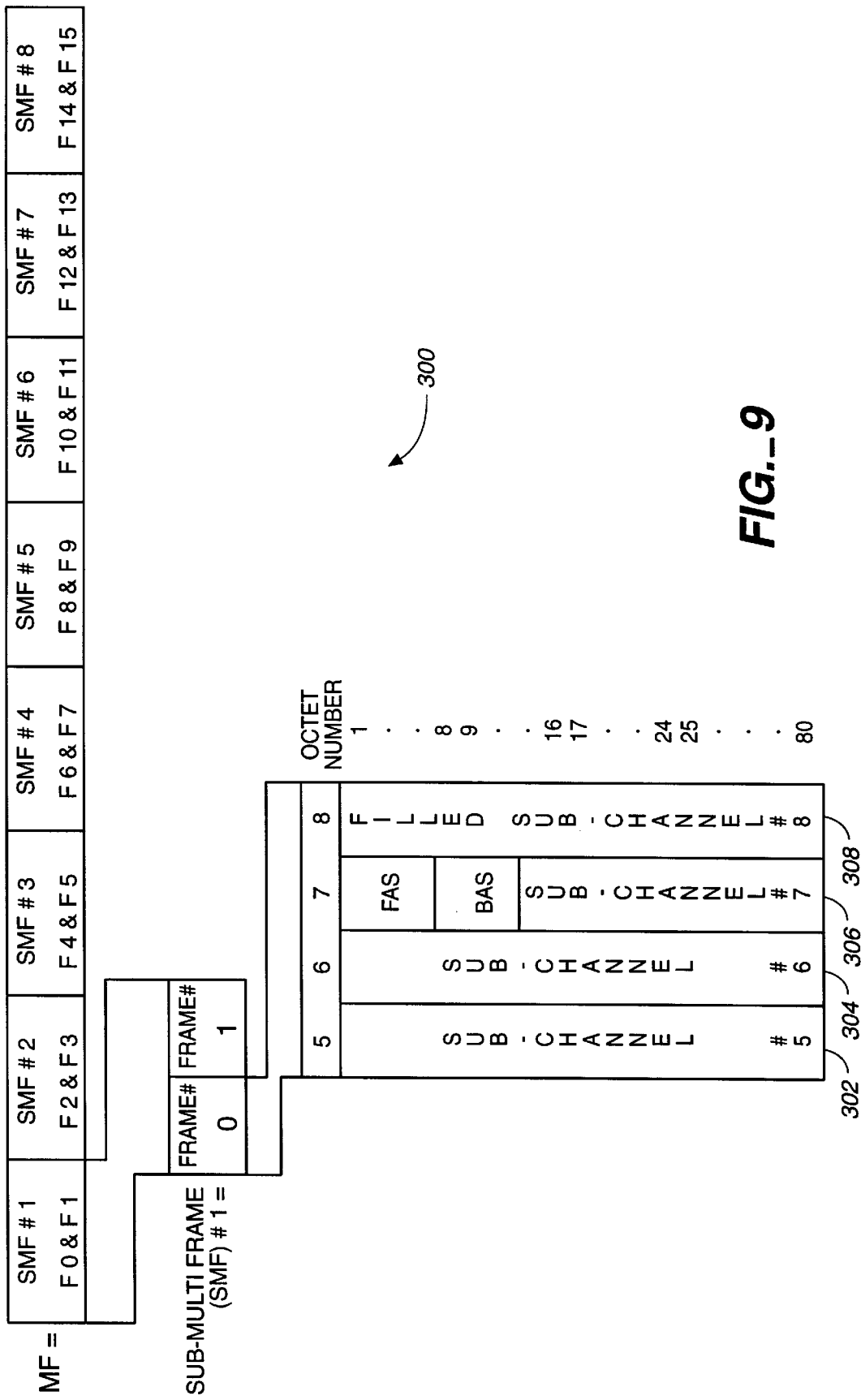
FIG._9

| 5 | 6 | 7 | 8 | OCTET NUMBER |
|---|---|---|---|---|
| 1 | 2 |  | 1 | 1 |
| 3 | 4 | FAS | 1 | . |
| . | . |  | 1 | . |
| 15 | 16 |  | . | 8 |
| 17 | 18 |  | . | 9 |
| . | . | BAS | 1 | . |
| . | . |  | 1 | . |
| 31 | 32 |  | . | 16 |
| 33 | 34 | 161 | . | 17 |
| . | . | . | . | . |
| 47 | 48 | . | . | . |
| 49 | . | . | . | . |
| . | . | . | . | . |
| . | . | 176 | 1 | . |
| . | . | . | . | . |
| . | . | . | . | . |
| 159 | 160 | 224 | 1 | 80 |

| 5 | 6 | 7 | 8 | OCTET NUMBER |
|---|---|---|---|---|
| A1 | A2 |  | F | 1 |
| A3 | A4 | FAS | I | . |
| . | . |  | L | . |
| A15 | A16 |  | L | 8 |
| A17 | A18 |  | E | 9 |
| . | . | BAS | D | . |
| . | . |  |  | . |
| A31 | A32 |  | W | 16 |
| A33 | A34 | V113 | I | 17 |
| . | . | . | T | . |
| A47 | A48 | . | H | . |
| V1 | V2 | . |  | . |
| . | . | . | 1 | . |
| . | . | V128 | . | . |
| . | . | . | S | . |
| . | . | . |  | . |
| V111 | V112 |  |  | 80 |

| 5 | 6 | 7 | 8 | OCTET NUMBER |
|---|---|---|---|---|
| A1 | A2 | | F | 1 |
| A3 | A4 | FAS | I | . |
| . | . | | L | . |
| A15 | A16 | | L | 8 |
| A17 | A18 | | E | 9 |
| . | . | BAS | D | . |
| . | . | | | . |
| A31 | A32 | | W | 16 |
| A33 | A34 | D9 | I | 17 |
| . | . | . | T | . |
| A47 | A48 | . | H | . |
| V1 | V2 | . | | . |
| . | . | . | 1 | . |
| . | V104 | D24 | ' | . |
| D1 | . | | S | . |
| . | . | | | . |
| D7 | D8 | | | 80 |
|  302 | 304 | 306 | 308 | |

FIG._12

VIDEOPHONE FOR SIMULTANEOUS AUDIO AND VIDEO COMMUNICATION VIA A STANDARD TELEPHONE LINE

CROSS-REFERENCE TO RELATED APPLICATIONS

This application is a continuation of SC/Ser. No. 08/681,938, Jul. 29, 1996, abandoned, which is a continuation of SC/Ser. No. 08/424,729, Apr. 19, 1995, U.S. Pat. No. 5,541,640, which is a continuation of SC/Ser. No. 08/330,219, Oct. 27, 1994, abandoned, which is a continuation of SC/Ser. No. 08/243,529, May 13, 1994, abandoned, which is a continuation of SC/Ser. No. 07/903,231, Jun. 23, 1992, abandoned.

BACKGROUND OF THE INVENTION

The present invention relates in general to telecommunications and, more particularly, to telecommunication systems for transmitting both audio and video signals from a local station to a remote station, as well as receiving audio and video from the remote station at the local station. Specifically, one embodiment of the invention provides a "videophone" apparatus and method which enable simultaneous audio and video telecommunication between stations connected by a standard bidirectional (full duplex) telephone line in the form of a twisted pair.

Telephones have been in widespread use for more than a century. As is well known, telephones enable a code comprising a telephone number to be entered at a local station. This code is employed to effectuate audio communication with a remote station identified by the code. The local and remote stations are connected through sophisticated telephone systems comprising wiring, automated switching networks responsive to entered codes, and, in the case of long distance, long-haul microwave links and/or oceanic wires or optical fiber cables for interconnecting the local and remote stations. The wiring that connects to the local and remote stations is typically a standard telephone line in the form of a twisted pair. These telephone systems are generally provided by regulated common carriers.

The configuration of current telephone systems does not per se constitute a part of the present invention and therefore will not be described in further detail, except to mention that the bandwidth of standard telephone systems is limited, as is well known. That is, the range of analog signal frequencies and the rate at which a digitally coded signal can be communicated by a standard telephone line are limited. As will become clear as the description continues, the major limiting factor and a problem addressed by one embodiment of the invention is that the effective (coded) synchronous digital bandwidth is believed to be less than approximately 56 kilobits per second (kbps). Stated differently, it would require the equivalent of 5,000 standard telephone lines to transmit television-quality pictures at the typical rate of 30 frames per second for television.

The concept of integrating video communication with the audio communication traditionally provided by the telephone is old. For example, at the 1964 World's Fair in New York City, American Telephone & Telegraph Company exhibited a "picture phone" by which both audio and video were bidirectionally communicated between local and remote stations. This picture phone added a television camera, television transmitter and receiver, and television monitor to the telephone assembly at each of the stations. Moreover, in order to transceive (that is, both transmit and receive) audio and video, a dedicated high-capacity telephone line having a bandwidth adequate for bidirectional communication between the local and remote stations was provided. In fact, a dedicated telephone line not generally available to the public, known as a T-3, was used. Hence, this picture phone was futuristic and considered cost prohibitive for widespread commercial deployment.

After a hiatus, audio and video communication between local and remote stations re-appeared in the form of "video teleconferencing." Video teleconferencing systems are typically based in dedicated local and remote rooms. These video teleconferencing rooms were initially equipped with a system similar to the 1964 World's Fair picture phone system. Generally, these video teleconferencing systems have evolved to comprise a video camera connected to a video processor which digitizes the video signal, in turn connected to a communication controller for transmitting video over a high-capacity data communications link (a high-capacity digital telephone line, such as a T-1) leased from a common carrier. The video portion of the video teleconferencing system also comprises one or more television monitors connected to the video processor for displaying video. Recently, data compression techniques have been employed to render video transmission more efficient. For optimum audio quality and apparent synchronization between audio and video, audio is provided over another leased telephone line. Audio can be communicated over a standard telephone line, but audio quality is compromised (e.g., cross-talk, etc.). Also, synchronization between audio and video suffers not only because audio and video are being transceived by two different subsystems, but also due to propagation delay. Propagation delay is evident in visible loss of synchronization between audio and video, such as lip movement not synchronized with speech, especially if long distances are involved, for example, America to Europe or Japan. In any event, audio and video are transceived over different telephone lines. Such video teleconferencing systems are commercially available from PictureTel Corporation of Peabody, Mass., and Compression Labs Inc. of San Jose, Calif., for example, but are priced at tens of thousands of dollars and are therefore affordable generally only by businesses, beyond the reach of the home consumer budget. Consequently, widespread deployment of these video teleconferencing systems has not occurred.

As an alternative to video teleconferencing, Matsushita Electric Ltd. introduced a still-image, black-and-white visual telephone (Model Number WG-R2) in 1987. This visual telephone integrated a small video camera, video digitizer, communication controller, and cathode ray tube (CRT) display into a housing connected to either the same standard telephone line as the telephone assembly at each of the local and remote stations or to a second standard telephone line if the stations were equipped with two-line service. In the case of a single telephone line, audio and video were transmitted alternately under manual control. That is, the persons at the stations discontinued speaking whenever it was desired to transmit video, one pressed a send button to transmit a video snapshot, and this video snapshot was transmitted to the remote station and displayed. Thereafter, the conversation could be resumed. Therefore, audio and video were not communicated simultaneously. In the case of two telephone lines, video operation was independent of audio, so that video snapshots could be transmitted from one station to another, while audio continued uninterrupted over the second telephone line. However, even in the case of two telephone lines, video snapshots could not be simultaneously exchanged between the local and remote stations, so the persons at the stations needed to coordinate video communication so that an access conflict did not arise. In any event, not only were audio and video non-simultaneous over the same telephone line, but only still video snapshots could be transceived, whereas video teleconferencing provides motion video. Also, if a second telephone line were desired, an on-going charge for two-line telephone service was incurred.

Therefore, it would be desirable to have a telecommunication system which would provide simultaneous audio and video communication over a single standard bidirectional (full duplex) telephone line. Moreover, it would be desirable that such a videophone provide audio synchronized with motion video.

SUMMARY OF THE INVENTION

It has been discovered that audio and motion video can be simultaneously transmitted and received between a local station and a remote station via a standard bidirectional (full duplex) telephone line in the form of a twisted pair. This discovery is based on recognition of several considerations. Firstly, a standard telephone line has the capacity to communicate sufficient audio and video data to provide audio and motion video if the image size (that is, the active area of the video display) is reduced compared to the image size accommodated by conventional video teleconferencing systems. Secondly, the architecture of digital signal processing circuitry used in a videophone implementation can be optimized for audio and video, but particularly video, communication. Thirdly, audio and video data compression and decompression and encoding and decoding techniques can be effectively implemented resident in the optimized circuitry to minimize the amount of audio and video data that must be communicated.

One embodiment of the invention provides a videophone comprising a video camera means for transducing and digitizing images at a station and connected to a video processing means for compressing and encoding the digitized images into video data, which is in turn connected to a communication controller for formatting and transmitting the video data, and also comprises an audio transducer and digitizer connected to an audio processing means synchronized with the video processing means for compressing and encoding digitized sound and in turn connected to the communication controller for formatting and transmitting the audio data bundled with the video data for simultaneous communication via a standard telephone line. That is, the videophone can be plugged into a regular wall jack. The communication controller also preferably can receive and then unformat and unbundle audio and video data, and the audio processing means and the video processing means can decode and decompress the audio and video data, and the station further preferably comprises means connected to the video processing means for displaying images and an electroacoustic transducer connected to the audio processing means for reproducing sounds transmitted by another station. A complete videophone system comprises a plurality of such videophones connected by standard telephone lines.

Preferably, the video camera means is a color charge coupled device (CCD) camera which is selectively activated for operation by a person. Also, a mechanical shutter is preferably associated with the camera lens for selectively obstructing the camera to assure that the person can have privacy when privacy is desired. Preferably, the display means comprises a color liquid crystal display (LCD).

The video camera and display means are preferably mounted in a tiltable swivel housing. This enables the person to position them as desired for transducing and displaying images.

Moreover, the video processing means at the transmitting station preferably transmits video data to produce a displayed moving image which is not fuzzy, or blurred, at the receiving station. In this regard, the video processing means at the transmitting station receives an initial digitized image from the video camera means and compresses and encodes the video data. The video data are then stored until the communication controller formats and transmits the video data together with the associated audio data. Upon receipt of a subsequent digitized image, the video processing means detects changes in the digitized image with respect to the initial digitized image. Based on these changes, the video processing means compresses and encodes video data so that only video data corresponding to changes in the appearance of the image are stored to be formatted for transmission. If the appearance of the image changes significantly, for example, a person at the station moves a substantial portion of his or her body, the amount of changed video data can exceed the capability to transmit all of the changed video data to display a current image at the receiving station within the time period allotted for transmission. The amount of changed video data being stored therefore increases. In accordance with the invention, rather than format and transmit only delayed or partial changed video data, which would produce a substantially delayed and/or blurred image at the receiving station, the large amount of changed video data being stored are overwritten when the amount of changed video data being stored reaches a predetermined level, and new video data corresponding to the present appearance of the image are compressed, encoded, and stored. The new video data are formatted and transmitted, and, thereafter, the amount of subsequent changed video data stored are capable of being transmitted within the allotted time period. The image displayed at the receiving station therefore jumps ahead to an updated image without intervening blurred images. This produces a slightly stroboscopic effect when the appearance of the image at the transmitting station changes significantly, but this stroboscopic effect is preferred to a blurred effect. Therefore, clear motion images are displayed at the receiving station. Meanwhile, transmission of audio data continues normally.

Preferably, the videophone in accordance with one embodiment of the invention incorporates a store and forward mode, which enables an image to be transduced and digitized by the video camera means, compressed, encoded, and stored with or without associated sound when a person presses a button. The images and any associated sound can be played back at the transmitting station by decoding, decompressing, and reproducing the stored video and any associated audio data. Also, the stored video and any associated audio data can be later transmitted under control of the person to a receiving station, thereby enabling stored video and any associated audio data to be decoded, decompressed, and reproduced at the receiving station. Additionally, the video and any associated audio data received by the receiving station can in turn be stored at the receiving station and thereafter played back and/or transmitted to another station under control of the person at the initial receiving station. Furthermore, either the person at the initial transmitting station or the person at the initial receiving station, or both, can store excerpts of video and any associated audio data transmitted by the other station during operation and thereafter play back and/or transmit the stored excerpts to yet another station.

BRIEF DESCRIPTION OF THE DRAWINGS

The above and other objects and features and the concomitant advantages of the present invention will be better understood and appreciated by those skilled in the art in view of the description of the preferred embodiments given below in conjunction with the accompanying drawings. In the drawings:

FIG. 1 is a block diagram of one embodiment of the videophone in accordance with the invention to provide audio and motion video simultaneously via a standard bidirectional (full duplex) telephone line in the form of a twisted pair;

FIG. 2, comprising FIGS. 2A and 2B, is a schematic diagram of a digital audio signal processor incorporated into one exemplary implementation of the videophone shown in FIG. 1;

FIG. 3 is a schematic diagram of a vision controller incorporated into one exemplary implementation of the videophone shown in FIG. 1;

FIG. 4 illustrates image parameters that are downloaded to the vision controller shown in FIG. 3;

FIG. 5, comprising FIGS. 5A and 5B is a schematic diagram of a vision processor incorporated into one exemplary implementation of the videophone shown in FIG. 1;

FIG. 6, comprising FIGS. 6A and 6B is a block diagram similar to FIG. 1 in which two videophones are shown to facilitate an understanding of operation of one embodiment of the videophone system in accordance with the invention;

FIG. 7, comprising FIGS. 7A, 7B, 7C, and 7D, is a flow chart of an embodiment of a method in accordance with the invention for video data processing to provide clear, rather than blurred, motion video;

FIG. 8, comprising FIGS. 8A, 8B1, and 8B2, is an isometric view of a housing having a control console incorporated into the videophones shown in FIG. 6;

FIG. 9 illustrates a portion of a known digital telecommunication format;

FIG. 10 illustrates bit position numbering for the portion of the digital telecommunication format shown in FIG. 9;

FIG. 11 illustrates how the portion of the digital telecommunication format shown in FIG. 10 is employed for one exemplary implementation of audio and motion video communication for the videophones shown in FIGS. 1 and 6; and FIG. 12 illustrates a modification of the portion of the digital telecommunication format shown in FIG. 11, in which other data is communicated in lieu of a portion of video data.

DETAILED DESCRIPTION OF THE PREFERRED EMBODIMENTS

Known picture phones and video teleconferencing systems have required the use of at least one dedicated high-capacity telephone line for communication of motion video data. Additionally, in known video teleconferencing systems, a separate telephone line has been used for audio data communication. Consequently, known picture phones and video teleconferencing systems have not enabled communication of motion video data over a standard telephone line, and video and audio data in known video teleconferencing systems have been communicated separately. If the image at the transmitting station were to change rapidly, blurring appears in the images reproduced at the receiving station. Moreover, not only have the video and audio data been transceived over separate telephone lines in known video teleconferencing systems, but the corresponding images and sound have been asynchronously reproduced at the receiving station, which has resulted in visible loss of synchronization between the images reproduced on a cathode ray tube (CRT) display and sound, such as the associated speech.

In order to overcome these disadvantages, one embodiment of the invention provides a videophone for communicating both audio and motion video data via a standard bidirectional (full duplex) telephone line in the form of a twisted pair. The videophone in accordance with one embodiment of the invention transduces and digitizes images and employs data compression and encoding techniques to process the digitized images into video data to be formatted for transmission so as to substantially increase the effective bandwidth of the standard telephone line. Additionally, the videophone of the invention transduces and digitizes sound and employs data compression and encoding techniques to process the digitized sound into audio data which are bundled with the video data and formatted for transmission via the standard telephone line so that the images and sound are synchronized when the images and sound are reproduced at the receiving station. The videophone in accordance with one embodiment of the invention incorporates high-speed digital circuitry to optimize compression and encoding of the audio and video data to be formatted for transmission via the standard telephone line.

Moreover, the videophone in accordance with one embodiment of the invention provides clear motion video. When there are only minimal changes in the appearance of images that are transduced at the transmitting station, such as a person moving his or her lips and/or head, the images reproduced at the receiving station provide the appearance of full-motion video. However, if there is a rapid or significant amount of change in the appearance of the images at the transmitting station, which substantially increases the amount of video data that must be transmitted, in accordance with one embodiment of the invention, a video data processing method referred to as "jump ahead" is employed at the transmitting station so that new video data are formatted for transmission, instead of the accumulated video data being formatted and transmitted. This eliminates blur in the images reproduced at the receiving station. Hence, the images reproduced at the receiving station range from non-blurred motion video, if only slight changes occur in the images at the transmitting station, to non-blurred slightly stroboscopic images when significant motion occurs at the transmitting station. Even the slightly stroboscopic images are aesthetically pleasing compared to images provided by known picture phones and video teleconferencing systems, since there is no blur in the images reproduced at the receiving station, and superior in the sense that image and sound synchronization is effectively maintained, which is not the case with known video teleconferencing systems. That is, even at an effective 768 kbps transmission rate over a high-capacity telephone line, video teleconferencing systems evidence blur and loss of video and audio synchronization when changes in the appearance of the images at the transmitting station are rapid.

The embodiment of the videophone in accordance with the invention for communication of audio and video data via a standard telephone line provides motion images compared to the known visual telephone which provided only still-frame images. Furthermore, synchronized sound and motion images are provided by the videophone in accordance with one embodiment of the invention, as compared to alternate sound and on-demand snapshots provided over the same standard telephone line by the visual telephone. The videophone of the invention requires only a single standard telephone line for simultaneous bidirectional (full duplex) audio and motion video data communication, whereas the known visual telephone only provided audio and asynchronous still-frame video data contemporaneously if two standard telephone lines were used.

Furthermore, the images reproduced by known picture phone, video teleconferencing, and visual telephone systems have been displayed on CRT displays or video projectors. In contrast to these known systems, one embodiment of the videophone in accordance with the invention preferably incorporates a flat panel liquid crystal display (LCD) for displaying images. This enables the videophone of the invention to be much more compact and require less power.

For example, the LCD can be a 128×112 picture element (pixel) color LCD. However, the display can alternatively be a black-and-white LCD. The images are transduced and digitized by a charge coupled device (CCD) chip video camera having a plastic lens. Preferably, a mechanical shutter is associated with the plastic lens, which can be manually positioned to obstruct the lens so that the CCD video camera is mechanically disabled if a person desires to have privacy. The LCD and the CCD video camera are preferably mounted in a tilt and swivel housing for ease of positioning the video camera and viewing screen to facilitate use of the videophone in accordance with one embodiment of the invention. This also enables the videophone of the invention to be housed in a compact housing.

The videophone in accordance with one embodiment of the invention also incorporates a microphone and a speaker, such as are present in conventional speakerphones. Preferably, the speaker is a high quality speaker for reproducing sound. Alternatively, a conventional telephone handset can be used.

The videophone in accordance with one embodiment of the invention can also incorporate other features of conventional telephone assemblies, such as a speed dialer, last number redial, etc. This enables the videophone of the invention to supplant the need for even the most sophisticated conventional telephone.

The videophone in accordance with one embodiment of the invention enables images and accompanying sound to be synchronously transduced and simultaneously transmitted by the transmitting station to a receiving station where the images and associated sound are reproduced with synchronization between the images and the sound. Moreover, the synchronized audio and video data are communicated via a single standard bidirectional (full duplex) telephone line, instead of a high-capacity telephone line. Motion images are communicated between the stations. Only video data which represents changes in images are typically transmitted with redundant unchanged video data common to successive images being eliminated from transmission. That is, only video data which changes frame-to-frame is typically transmitted. A communication controller is incorporated into the videophone in accordance with one embodiment of the invention to format and transmit the audio and video data to provide sound synchronized with the images.

In accordance with one embodiment of the videophone of the invention, blur is eliminated from images reproduced at the receiving station based on video data processing performed at the transmitting station so that changed video data are transmitted only so long as changed video data can be effectively communicated during the allotted transmission period. If the amount of changed video data exceeds throughput capability, the jump ahead method in accordance with the invention intervenes so that video data corresponding to a new video data sequence is transmitted. Hence, at the receiving station, video data is not simply partially updated from frame-to-frame with accompanying delay and/or blur due to transmission constraints which allow only a limited amount of changed video data to be transmitted from frame-to-frame. That is, the image quality enhancement afforded by the jump ahead method in accordance with the invention operates to constrain update of images reproduced at the receiving station to occur only as fast as a complete set of changed video data can be communicated to the receiving station for updating the displayed image based on received changed video data. Then and only then is the previous image displayed at the receiving station rewritten. If a complete set of changed video data cannot be effectively transmitted during the allocated transmission period, then video data corresponding to a new image is transmitted, and the previous image displayed at the receiving station is erased and replaced with the new image.

Finally, the videophone in accordance with one embodiment of the invention incorporates a store and forward mode, which enables an image to be transduced and digitized by the video camera means, compressed and encoded by the video processing means, and stored in memory with or without associated audio data when a person presses a button. The images and any associated sound can be played back at the transmitting station by decoding, decompressing, and reproducing the stored video and any associated audio data. Also, the stored video and any associated audio data can be later transmitted to a receiving station under the control of the person, thereby enabling stored video and any associated audio data to be decoded, decompressed, and reproduced at the receiving station. Additionally, the video and any associated audio data received by the receiving station can in turn be stored at the receiving station and thereafter played back and/or transmitted to another station under control of the person at the initial receiving station. Furthermore, either the person at the initial transmitting station or the person at the initial receiving station, or both, can store excerpts of video and any associated audio data transmitted by the other station during operation. Thereafter, these excerpts can be played back and/or transmitted to yet another station.

Referring to FIG. 1, one embodiment of a videophone in accordance with the invention, generally indicated by the numeral 10, is deployed at a local station. The videophone 10 is connected to a standard bidirectional (full duplex) telephone line 12 comprising a twisted pair.

The videophone 10 comprises an audio circuit 14 connected to a communication controller 16 which is in turn connected to the standard telephone line 12. The audio circuit 14 and the communication controller 16 enable both transmission of audio data to a videophone 10' at a remote station and reception of audio data from the videophone at the remote station via the standard telephone line 12.

The videophone 10 further comprises a video circuit 18 which is also connected to the communication controller 16 that is in turn connected to the standard telephone line 12, as described above. The video circuit 18 and the communication controller 16 enable both transmission of video data to the videophone 10' at the remote station and reception of video data from the videophone at the remote station via the standard telephone line 12.

Considered in more detail, the audio circuit 14 comprises a microphone 20 for converting acoustical signals in the proximity of the videophone 10, such as speech, to analog electrical signals. For example, the microphone 20 can comprise a microphone of the type commonly used in conventional speakerphones or, alternatively, the microphone in the mouthpiece of a handset of a conventional telephone assembly.

The audio circuit 14 also comprises an analog-to-digital converter (ADC) 22 having an input connected to an output of the microphone 20. The ADC 22 digitizes the analog electrical signals produced by the microphone 20 in response to speech and other sounds present at the videophone 10.

The audio circuit 14 further comprises a digital audio signal processor 24 having an input connected to an output of the ADC 22 for receiving the digitized audio signals and compressing and encoding the digitized audio signals into audio data. For example, the digital audio signal processor 24 can be a DSP3210 32-bit floating-point digital audio signal processor available from AT&T Microelectronics located in Allentown, Pa. The architecture of the DSP3210 digital audio signal processor combines a hardware floating-point arithmetic unit with an architecture that supports four memory accesses per instruction cycle to enable up to 33 million floating-point operations per second to be performed with a clock rate of 66.7 MHz. The operating system for the DSP3210 digital audio signal processor is the AT&T visible caching operating system for speech processing, including speech coding by vector quantization, and provides acoustic echo cancellation which compensates for delays inherent in audio data compression and decompression. The DSP3210 digital audio signal processor will be described in more detail later.

As shown in FIG. 1, the audio circuit 14 additionally comprises a digital-to-analog converter (DAC) 26 having an input connected to an output of the digital audio signal processor 24. In one exemplary implementation of the videophone 10, the ADC 22 and the DAC 26 are resident on the same integrated circuit (chip), for example, a Model Number T7525 available from AT&T Microelectronics. The DAC 26 converts the digital representation of speech and other sounds which occur at the videophone 10' and are transmitted to the videophone 10 to analog electrical signals. The audio circuit 14 further comprises an amplifier 28 having an input connected to an output of the DAC 26, as well as an electroacoustic transducer 30 having an input connected to an output of the amplifier. The amplifier 28 amplifies the analog electrical signals corresponding to speech and other sounds which occur at the videophone 10' and are transmitted to the videophone 10 for driving the electroacoustic transducer 30 to reproduce the speech and other sounds received from the videophone 10' as audible signals. For example, the electroacoustic transducer 30 can comprise the loudspeaker in the earpiece of a handset of a conventional telephone assembly or a loudspeaker of the type commonly used in conventional speakerphones.

As shown in FIG. 1, the communication controller 16 comprises a system sequencer 32 having a bidirectional host bus 34 connected to the digital audio signal processor 24 for communication of status and control information between the digital audio signal processor and the system sequencer. For example, the system sequencer 32 can be an MC68020 series microprocessor available from Motorola, Inc., headquartered in Schamburg, Ill., or an 80×86 series microprocessor available from Intel Corporation, located in Santa Clara, Calif., together with a system clock. The system sequencer 32 bundles the audio data produced by the audio circuit 14 with video data produced by the video circuit 18 so that the bundled audio and video data are synchronized, as well as formats the audio and video data for transmission. More particularly, the system sequencer 32 is a communications protocol controller which optimizes bus traffic for the audio circuit 14 and the video circuit 18 and performs a variety of system-level multiplexing/demultiplexing, synchronization, buffer management, error correction/detection, and communications operations. The system sequencer 32 preferably performs multiplexing, demultiplexing, and framing of audio, video, and/or other data for communication based on the CCITT H.221 specification "Frame Structure For a 64 to 1920 kbit/s Channel in Audiovisual Teleservices," International Telecommunication Union, Geneva, 1990, the disclosure of which is hereby incorporated herein in its entirety by this reference. Additionally, buffer management and synchronization of audio and video data conforming to the CCITT H.221 and H.261 specifications are performed by the system sequencer 32. The disclosure of the CCITT H.261 specification "Line Transmission of Non-Telephone Signals, Video Codec For Audiovisual Services at p×64 kbit/s," International Telecommunication Union, Geneva, 1990, is also hereby incorporated herein in its entirety by this reference. The system sequencer 32 can be configured to support full duplex operation by transmitting and receiving CCITT H.221 and H.261 standard framed audio and video data. The system sequencer 32 also preferably performs forward error correction, channel management, and call set up and tear down in accordance with the protocols contained in the CCITT H.221, H.242, and H.261 specifications. The disclosure of the CCITT H.242 specification "System For Establishing Communication Between Audiovisual Terminals Using Digital Channels Up to 2 Mbit/s," International Telecommunication Union, Geneva, 1990, is also hereby incorporated herein in its entirety by this reference.

Additionally, the communication controller 16 comprises a modem circuit 36 interfaced to the system sequencer 32 over a serial bus 38. For example, the modem circuit 36 can be a commercially available modem chip which operates at 19.2 kbps. Alternatively, the modem circuit 36 can be a series 326×FAST series 24 kbps codex modem chip available from Motorola, Inc., located in Mansfield, Mass., which operates in accordance with the proposed CCITT V.fast standard for synchronous modulation and data compression that enables support of 24 kbps full duplex synchronous transmission over the standard telephone line 12.

Finally, the communication controller 16 comprises a line interface 40 interfaced to the modem circuit 36 over a serial bus 42. For example, the line interface 40 can be a conventional serial line interface. The line interface 40 is in turn connected to the standard telephone line 12.

As shown in FIG. 1, the video circuit 18 preferably comprises a charge coupled device (CCD) camera 44. The CCD camera 44 includes a CCD camera lens 44A mounted to a CCD chip 44B. The CCD camera 44 transduces and digitizes images at the videophone 10 in the field of view of the CCD camera lens 44A into a representation of the images in the form of a stream of pixel blocks. For example, the CCD camera 44 can be a Model Number C35T color CCD chip and camera lens assembly available from Sony Corporation of America, Component Products Company, located in Cypress, Calif. In the case of a color CCD camera, the pixel stream is in the form of a stream of red-green-blue (RGB) encoded pixel blocks.

The video circuit 18 also comprises an input pixel buffer 46 having an input pixel bus which interfaces to an output of the CCD chip 44B and an output which interfaces to a vision controller 48A. The stream of pixel blocks from the CCD camera 44 is fed to the input pixel buffer 46 and in turn to the vision controller 48A which interfaces to a vision processor 48B. The vision controller 48A and the vision processor 48B compress and encode the stream of pixel blocks into video data to be formatted for transmission so as to increase the effective bandwidth of the standard telephone line 12. The programmable architecture of the vision controller 48A and the vision processor 48B enables execution of CCITT H.261 standard algorithms for motion video data compression and decompression and encoding and decoding, as will be described later. Also, as will be described later, the vision controller 48A further processes video data prior to transmission in the event that the throughput of the modem circuit 36 and/or the standard telephone line 12 is insufficient to transmit the amount of changed video data that is needed for transmission to the videophone 10' to reproduce a clear image, for example, if there is substantial movement of a significant portion of the image transduced and digitized by the CCD camera 44 during operation of the videophone 10.

The vision controller 48A and the vision processor 48B can comprise two very large scale integration (VLSI) chips. The vision controller 48A is preferably a resource manager and image pre-and post-processor for the vision processor 48B. The vision processor 48B is preferably a programmable CCITT H.261 compatible p×64 QCIF encoding/decoding engine.

The video circuit 18 also comprises a boot read only memory (ROM) and data storage 48C for the vision controller 48A and the vision processor 48B. The data storage portion of the boot ROM and data storage 48C is preferably static random access memory (SRAM). The boot ROM and data storage 48C is also preferably accessible by the digital audio signal processor 24 and the system sequencer 32 over the host bus 34 to avoid the need for additional separate boot ROM and data storage for the digital audio signal processor and the system sequencer.

The video circuit 18 also comprises a memory buffer 50 which interfaces to the vision controller 48A and the vision processor 48B and which also interfaces to an audio/video data buffer memory 52. The audio/video data buffer memory 52 is preferably dynamic random access memory (DRAM). The host bus 34 interfaces the vision controller 48A to the communication controller 16. As well as transferring video data received from the videophone 10' to the audio/video data buffer memory 52, the host bus 34 can be used by the system sequencer 32 to program parameters employed by the vision controller 48A and the vision processor 48B, such as Huffman and quantization tables, and for communication of status and control information between the vision controller and the vision processor, on the one hand, and the system sequencer, on the other hand. The input of the audio/video data buffer memory 52 also preferably interfaces over the host bus 34 to the digital audio signal processor 24 and is used to store audio data compressed and encoded by the digital audio signal processor, as well as compressed and encoded audio data received from the videophone 10' and transferred to the audio/video data buffer memory over the host bus by the system sequencer 32.

The video circuit 18 also comprises a latch 54 having an input which interfaces to the vision controller 48A and an output pixel bus which interfaces to an input of a liquid crystal display (LCD) 56, preferably a color LCD, or other display (monitor) for displaying images. The vision controller 48A and the vision processor 48B decode and decompress video data received from the videophone 10' into RGB encoded pixel blocks which are routed by the latch 54 to an LCD driver chip 56A which in turn feeds pixel information to an LCD panel 56B for reproducing images received from the videophone 10', as well as for play back of images transduced or stored at the videophone 10. For example, the LCD 56 can be a 128×112 color LCD module available from Sanyo Semiconductor Corporation, located in Allendale, N.J., comprising an LCD driver chip 56A integrated with an LCD panel 56B.

In one exemplary implementation of the videophone 10 of the invention, the input pixel buffer 46, vision controller 48A, vision processor 48B, boot ROM and data storage 48C, memory buffer 50, audio/video data buffer memory 52, and latch 54 can be an integrated vision module (IVM) plus glue logic, reference memory, firmware, and software, available from Integrated Information Technology, Inc., located in Santa Clara, Calif. More detailed information can be obtained from the "IIT IVM, INTEGRATED VISION MODULE, DATA SHEET" published by Integrated Information Technology, Inc., the disclosure of which is hereby incorporated herein in its entirety by this reference.

In one exemplary implementation of the videophone 10 of the invention which incorporates a 128×112 color LCD, the vision controller 48A and the vision processor 48B provide a CCITT H.261 p×64 QCIF codec at 30 frames per second modified for a 128×112 pixel format to provide motion video communication, as well as video data storage and retrieval in connection with the store and forward mode of the videophone. The exemplary implementation of the videophone 10 is therefore based on the p×64 QCIF CCITT H.261 specification for video compression and decompression and encoding and decoding, the CCITT H.221 specification for full duplex synchronized audio and motion video communication framing, and the CCITT H.242 specification for call setup and disconnect, with the CCITT H.261 specification being modified for a 128×112 color LCD and also modified to provide jump ahead images and with the CCITT H.221 specification being modified for audio and video data communication at 19.2 or 24 kbps, as will be described in more detail later. First, the digital audio signal processor 24, the vision controller 48A, and the vision processor 48B in one exemplary implementation of the videophone 10 of the invention will be described in more detail.

In one exemplary implementation of the videophone 10, the digital audio signal processor 24 can be a DSP3210 digital audio signal processor and associated visible caching operating system (VCOS) Multimedia Module Library (MML). The library includes a broad range of functions in the areas of audio data compression and decompression and encoding and decoding. Rather than compete with the host operating system of the system sequencer 32, VCOS executes as a task under the host operating system, and, hence, VCOS is an open, platform-independent operating system that ports easily to a variety of host operating systems.

The DSP3210 digital audio signal processor is a single-chip, floating-point digital signal processor specifically configured for speech and sound encoding/decoding for low-cost computer systems. The DSP3210 digital audio signal processor is a 32-bit, floating-point, programmable digital signal processor designed for use in numerically intensive applications which require fast floating-point arithmetic, efficient compiler-generated code, and low power dissipation. The architecture of the DSP3210 digital audio signal processor comprises two execution units, a 32-bit integer reduced-instruction-set-computer (RISC) controller and a 32-bit floating-point data processing unit, together with two 1 k×32-bit parallel, on-chip memories and a high-bandwidth bus interface which deliver operands and instructions to the execution units supporting up to four memory accesses per instruction cycle. The architecture of the DSP3210 digital audio signal processor also comprises on-chip peripherals including a serial interface port, bit input/output (I/O) port, and timer.

As shown in FIG. 2, in one exemplary implementation of the videophone 10 the digital audio signal processor 24 is a DSP3210 digital audio signal processor which comprises seven functional elements. These functional elements are a Control Arithmetic Unit (CAU) 60, Data Arithmetic Unit (DAU) 62, On-Chip Memory (RAM0 64, RAM1 66, and Boot ROM 68), Bus Interface 70, Serial I/O (SIO) 72, DMA Controller (DMAC) 74, and Timer/Status/Control (TSC) 76.

The CAU 60 performs address calculations, branching control, and 16- or 32-bit integer arithmetic and logic operations. The CAU 60 is a RISC core comprising a 32-bit arithmetic logic unit (ALU) that performs the integer arithmetic and logical operations, a 32-bit program counter (pc), and twenty-two 32-bit general purpose registers. The CAU 60 can execute 16.7 million instructions per second (MIPS).

Generally, the CAU 60 performs two tasks. One task is to execute integer, data move, and control instructions (CA instructions). The other task is to generate addresses for the operands of floating-point instructions (DA instructions). CA instructions perform load/store, branching control, and 16-and 32-bit integer arithmetic and logical operations. DA instructions can have up to four memory accesses per instruction cycle, and the CAU 60 generates the addresses using the post-modified, register-indirect addressing mode, one address in each of the four states of an instruction cycle.

The DAU 62 is the primary execution unit for digital signal processing algorithms. The DAU 62 contains a 32-bit floating-point multiplier 78, a 40-bit floating-point adder 80, four 40-bit accumulators, and two control registers (dauc and ctr). The multiplier 78 and the adder 80 operate in parallel to perform 16.7 million computations per second of the form a=b+c*d. The multiplier 78 and the adder 80 each produce one result per instruction cycle. The DAU 62 contains a four-stage pipeline, namely, operand load, multiply, accumulate, and result store. Therefore, during any instruction cycle, the DAU 62 can be processing four different instructions, each in a different stage of execution.

The DAU 62 supports two floating-point formats, single precision (32-bit) and extended single precision (40-bit). Extended single precision provides eight additional mantissa guard bits. Post-normalization logic transparently shifts binary points and adjusts exponents to prevent inaccurate rounding of bits when the floating-point numbers are added or multiplied, eliminating scaling and quantization error. All normalization is performed automatically so that the result in the accumulator is fully normalized.

Single instruction, data type conversions are performed by hardware in the DAU 62, thereby reducing overhead associated with these conversions. The DAU 62 performs data type conversions between the 32-bit floating-point format of the DSP3210 digital audio signal processor and the IEEE P754 standard 32-bit floating-point, 16- and 32-bit integer, 8-bit unsigned, and µ-law and A-law formats. The DAU 62 also provides an instruction to convert a 32-bit floating-point operand to a 3-bit seed value used for reciprocal approximation in division operations.

The DSP3210 digital audio signal processor incorporates on-chip memory for instructions and data which can arbitrarily reside in any location in the on-chip memory. The on-chip memory comprises two 1 k×32 RAMs (RAM0 64 and RAM1 66) and a 256×32 Boot ROM 68. The memories operate in parallel to achieve high performance. The Boot ROM 68 is preprogrammed with a routine that can load the on-chip RAMs (RAM0 64 and RAM1 66) from an external memory, such as the boot ROM and data storage 48C shown in FIG. 1, over the host bus 34.

The bus interface 70 of the DSP3210 digital audio signal processor interfaces to the host bus 34 and comprises an external address bus which is 32 bits wide and fully byte addressable, allowing the DSP3210 digital audio signal processor to directly address up to four Gbytes of external memory or memory-mapped hardware. External memory, such as the audio/video data buffer memory 52 shown in FIG. 1, is partitioned into two logical address spaces A and B. The number of wait states for external memory partitions A and B are independently configurable via a pcw register. Configured waits of zero, one, two, or three-or-more wait states are programmable. This simplifies the interface to external memory. Each wait state is one-quarter of an instruction cycle. When waits are externally controlled, the DSP3210 digital audio signal processor adds wait states until the audio/video data buffer memory 52 acknowledges the transaction via an SRDYN pin. The bus interface 70 supports retry, relinquish/retry, and bus error exception handling. All signalling provided to the system sequencer 32 shown in FIG. 1 is configurable on reset to simplify the interface to a variety of microprocessor system busses.

Preferably, the DSP3210 digital audio signal processor shares the host bus 34 and interfaces to the audio/video data buffer memory 52 shown in FIG. 1 through a request/acknowledge protocol. The interface bus comprises an address bus A2–A31, a data bus D0–D31, and associated control pins. System throughput is greatly enhanced by the ability to execute from internal memory while the DSP3210 digital audio signal processor does not have ownership of the host bus 34. The DSP3210 digital audio signal processor is a default bus slave. When the DSP3210 digital audio signal processor does not have ownership of the host bus 34, the DSP3210 digital audio signal processor continues to execute from internal memory until accesses to the audio/video data buffer memory 52 are needed. At that time, the DSP3210 digital audio signal processor asserts BRN and waits for a bus grant pin BGN to be asserted. A bus arbiter acknowledges the bus request by asserting BGN. The DSP3210 digital audio signal processor then acknowledges the grant by asserting a bus grant acknowledge BGACKN and drives the external memory interface pins. When BGN is negated, any on-going external memory transaction is completed before the DSP3210 digital audio signal processor relinquishes the host bus 34 by placing the audio/video data buffer memory 52 interface bus in the high-impedance state and negating BGACKN.

The SIO 72 provides serial communication and synchronization with external devices, such as the ADC 22 and the DAC 26 shown in FIG. 1. The external signals that are provided support a direct interface to a time-division-multiplexed (TDM) line and a zero-chip interface to codecs. The SIO 72 performs serial-to-parallel conversion of input data and parallel-to-serial conversion of output data, at a maximum rate of 25 Mbits per second. The SIO 72 comprises a serial input port, a serial output port, and on-chip clock generators. Both ports are double buffered so that back-to-back transfers are possible. The SIO 72 is configurable via an ioc register. An input buffer (ibuf), an output buffer (obuf), and the ioc register are accessible as memory-mapped I/O (MMIO) registers in the instruction set.

The data sizes of the serial input and output can be selected independently. Input data lengths of eight, 16, and 32 bits and output data lengths of eight, 16, 24, and 32 bits can be selected. The input and output data can be selected to be most significant bit first or least significant bit first independently.

The SIO 72 transfers can be performed under program, interrupt, or DMA control. A program can test the input or output buffer status flags employing conventional branch instructions. By configuring an exception mask register (emr), interrupt requests can be generated by the input and output buffer status flags. In the DMA mode, transfers occur between the input buffer (ibuf), the output buffer (obuf), and memory without program intervention.

The DMA controller (DMAC) 74 comprises two DMA channels, one for input DMA and one for output DMA, that are used in conjunction with the SIO 72. By configuring the input DMA channel, data being shifted into the serial input port can be buffered in memory without processor intervention. By configuring the output DMA channel, a buffer of data in memory can be supplied to the serial output, as necessary, without processor intervention. The registers to configure the DMAC 74 are accessible as MMIO registers in the instruction set. By configuring the exception mask register (emr), interrupt requests can be generated when the memory buffer has been filled or emptied based on the size of the buffer requested.

The TSC 76 is a programmable 32-bit interval timer/counter that can be used for interval timing, rate generation, event counting, and/or waveform generation. The input to the TSC 76 is derived from the system clock of the system sequencer 32 shown in FIG. 1. The output of the TSC 76 can generate a maskable interrupt or be selected as an output to drive external hardware. The count-down timer can be configured to count to zero once, or to count continuously by automatically reloading the counter with its initial value when the counter reaches zero. The count value can be read or changed at any time during operation. The registers associated with the TSC 76 are accessible as MMIO registers in the instruction set. By configuring the exception mask register (emr), interrupt requests can be generated when the count reaches zero.

Finally, the TSC 76 comprises a BIO bus BIO0–BIO7 which is a general purpose 8-bit I/O port. The BIO bus includes features that enable board-level status signal generation and control signal testing by the DSP3210 digital audio signal processor. The BIO interface comprises eight I/O lines which can be independently configured as an input or an output. Outputs can be written with a logic high (logic 1) or a logic low (logic 0), toggled, or left unchanged. Inputs can be directly read and loaded into a register of the CAU 60 and then tested. The registers associated with the BIO are accessible as MMIO registers in the instruction set. Four of the BIO ports are used on reset to configure the memory map and bus interface. After reset, the four BIO ports can be used arbitrarily. A more detailed description of the DSP3210 digital audio signal processor is contained in "DSP3210 Digital Signal Processor, The Multimedia Solution, Information Manual," AT&T Microelectronics, September 1991, the disclosure of which is hereby incorporated herein in its entirety by this reference.

Advantageously, the DSP3210 digital audio signal processor can access memory in blocks rather than with random individual memory accesses. Blocks of data and their corresponding program segments can be read in block transfers. The real-time execution is then performed entirely within the DSP3210 digital audio signal processor and its internal memory. The VCOS operating system executes each task on the real-time execution list once every frame, where a frame is a unit of digital audio signal processor processing time, such as 10 milliseconds. The VCOS operating system executes non-real-time tasks during the frame time which remains after execution of all real-time tasks.

On the one hand, when analog audio signals appear at the output of the microphone 20 shown in FIG. 1, the ADC 22 digitizes the analog audio input and writes the digitized audio input to the DSP3210 digital audio signal processor. The DSP3210 digital audio signal processor initiates a record function and activates a speech coder module using a vcAddTask(record) function to read and then compress and encode the digitized audio input and write the resulting compressed and encoded audio data to the audio/video data buffer memory 52 over the host bus 34 shown in FIG. 1. The system sequencer 32 shown in FIG. 1 can then access the audio data stored in the audio/video data buffer memory 52 over the host bus 34, bundle the audio data with associated video data, format the audio and video data for transmission, and initialize the modem circuit 36 to transmit the formatted audio and video data to the remote videophone 10' via the line interface 40 and the standard telephone line 12. When the analog audio signals at the local videophone 10 cease, the DSP3210 digital audio signal processor executes a vcStopTask(record) function and enters an idle state.

On the other hand, during reproduction of audio data received by the local videophone 10, a playback function is initiated by the system sequencer 32 shown in FIG. 1. This function executes a vcAddTask(playback) call to load the playback task consisting of a speech decoder module into the internal memory of the DSP3210 digital audio signal processor. The speech decoder module decodes and decompresses the audio data input received by the local videophone 10. The vcAddTask(playback) call is followed by a TaskStart(playback) call which instructs the VCOS operating system to add the task to the execution list and initiate its execution.

At this point, the DSP3210 digital audio signal processor begins reading the stored encoded and compressed audio data input received by the local videophone 10. In this regard, the DSP3210 digital audio signal processor reads the audio data input from the audio/video data buffer memory 52 over the host bus 34 shown in FIG. 1 and writes the audio data input to the DSP3210 digital audio signal processor using a vcWriteAiao( ) function. The speech decoder module in turn reads a block of audio data input from the audio/video data buffer memory 52 shown in FIG. 1 every execution frame and decodes and decompresses the audio data. The speech decoder module then writes the decoded and decompressed block of audio data to the DAC 26 shown in FIG. 1. When the end of the audio data is reached, the DSP3210 digital audio signal processor executes a vcStopTask(playback) call to inform the VCOS operating system to remove the task from the execution list.

Regarding the processing of video data, the vision controller 48A shown in FIG. 1 includes high-speed pixel input and output ports, a RISC microcontroller, Huffman encoding and decoding hardware, and a buffered system interface. The vision controller 48A provides an interface to the audio/video data buffer memory 52 through control of the dedicated memory buffer 50 which can range from 512 k to 4M bytes in size.

As shown in FIG. 3, the vision controller 48A and the vision processor 48B can be reprogrammed from the default value (CCITT H.261 standard MPEG decode) by sending a command or commands to a VCinoutBuffer 90 of the vision controller 48A. That is, the required word or sequence of words is written to the VCinoutBuffer 90 to execute the desired command or commands. In the case of the videophone 10, a one-word command 0×0122 is employed to set the data compression and decompression format for the vision processor 48B to CCITT H.261 QCIF p×64 codec.

Also, in the case in which the CCD camera 44 and the LCD 56 shown in FIG. 1 operate to transduce and display color images, respectively, RGB to YUV color conversion matrix values are loaded into the VCinoutBuffer 90 to set color conversion values. The command is 0×0200, k1, k2, k3, k4, k5, k6, k7, k8, k9. This is based on the conversion matrix from YUV to RGB being: R=Y+k3*V, G=Y+k1*U+ k2*V, and B=Y+k4*U; and the conversion matrix from RGB to YUV being: Y=G*k5+B*k6+R*k7, U=(B−Y)*k8, and V=(R−Y)*k9. Moreover, in the case of color, the pixel format is determined by setting the pixel bus format to RGB444 with a command 0×400.

Furthermore, the screen values must be set based on the size of the LCD 56 shown in FIG. 1. That is, the size of the screen of the LCD panel 56B must be loaded, and various position values must also be loaded for a 128×112 pixel format in the exemplary implementation in which the size of the LCD panel is 128×112 pixels. With reference to FIG. 4, the command is 0×0300, Hsize, HsyncEnd, HblankStart, HblankEnd, Vsize, VsyncEnd, VblankStart, VblankEnd, CameraClipLeft, CameraClipRight, CameraClipTop, CameraClipBottom, ScreenClipLeft, ScreenClipRight, ScreenClipTop, ScreenClipBottom.

Also, input and output temporal filters in the form of the input pixel buffer 46 and the latch 54, respectively, shown in FIGS. 1 and 3 are activated. This is accomplished by entering a command 0×0500 to set the input pixel buffer 46 and by entering a command 0×0502 to set the latch 54 so that they are operational.

Additionally, since the vision controller 48A is interfaced by the memory buffer 50 to the audio/video data buffer memory 52 which the system sequencer 32 shown in FIG. 1 accesses in connection with transmission and reception of video data, the status of the memory buffer is set. This is accomplished by entering a command 0×0601 followed by the size in bytes to set the current buffer rate used.

As mentioned earlier, the vision controller 48A and the vision processor 48B can process video data received over the host bus 34 based on either Huffman or quantization tables. Accordingly, the following commands are employed to set the internal tables of the vision controller 48A and the vision processor 48B: the quantization table is selected by a command 0×0800; or the Huffman encode table is selected by a command 0×0801, and the Huffman decode table is selected by a command 0×0802.

Finally, there are various commands which enable access to internal memory space of the vision controller 48A. These upload/download commands are: 0×0900 addrhi addrlow numwords word0 . . . wordn for write to memory over the host bus 34 and 0×0901 addrhi addrlow numwords word0 . . . wordn for read from memory over the host bus.

The vision controller 48A is a 32-bit RISC microprocessor. The vision controller 48A provides a pixel block stream interface from the input pixel buffer 46 interfaced to the CCD camera 44, color converts from RGB to YUV, writes/reads converted raw images via the memory buffer 50 to/from the audio/video data buffer memory 52, controls the vision processor 48B to compress and encode the converted raw images, and writes compressed and encoded video data via the memory buffer to the audio/video data buffer memory. The vision controller 48A additionally routes video data output via the memory buffer 50 to the host bus 34 to be read by the system sequencer 32 shown in FIG. 1 for bundling and formatting with associated audio data for transmission to the remote videophone 10'. The vision controller 48A also reads compressed and encoded video data input received from the remote videophone 10' which appears on the host bus 34 under control of the system sequencer 32, controls the vision processor 48B to decode and decompress the video data, writes/reads converted raw images to/from the audio/video data buffer memory 52, color converts from YUV to RGB, and provides a pixel block stream via the latch 54 to the LCD 56.

Considered in more detail, during operation of the vision controller 48A, a logic low (logic 0) is applied to an HCS# input pin connected to the host bus 34, that is active logic low, so that the vision controller 48A and the vision processor 48B are selected for operation. An input pixel bus 92 interfaces an output of the input pixel buffer 46 to an RI[7:0] input pixel port for red pixel data from the CCD camera 44, a GI[7:0] input pixel port for green pixel data from the CCD camera, and a BI[7:0] input pixel port for blue pixel data from the CCD camera. The input pixel bus 92 also connects to various input pins of the vision controller 48A, as follows. PIXCK is an input pin of the vision controller 48A, to which is applied a pixel clock signal. VRESET is an input pin on which appears a general lock vertical signal. HRESET is an input pin to which is applied a general lock horizontal signal. The signals which appear on the PIXCK, VRESET, and HRESET input pins serve to synchronize input of RGB encoded pixel blocks from the CCD camera 44 via the input pixel buffer 46.

After video data is appropriately compressed and encoded by the vision processor 48B, the vision controller 48A preferably Huffman encodes the compressed and encoded video data and writes the resulting video data via the memory buffer 50 to the audio/video data buffer memory 52. Thereafter, the vision controller 48A reads the video data output via the memory buffer 50 and writes the video data to the host bus 34 under control of the system sequencer 32 shown in FIG. 1. The vision controller 48A comprises an HD[15:0] bidirectional host port which serves as a data bus connected to the host bus 34. The vision controller 48A also comprises various pins connected to the host bus 34 used in connection with video data output. HIRQOUT# is an output pin of the vision controller 48A connected to the host bus 34, that is active logic low (logic 0) and provides an interrupt request from the vision controller 48A to the system sequencer 32 to initiate video data output. HOE# is an input pin of the vision controller 48A connected to the host bus 34, to which the system sequencer 32 applies a logic low (logic 0) responsive to HIRQOUT#. HDT is an output pin of the vision controller 48A connected to the host bus 34, on which appears a serial data transmission signal after video data transfer is enabled. HSCLK is a bidirectional pin of the vision controller 48A connected to the host bus 34, which provides a serial clock signal. HTFS is a bidirectional pin of the vision controller 48A connected to the host bus 34, on which appears a transmit video frame synchronization signal.

When video data input is received from the remote videophone 10', the system sequencer 32 shown in FIG. 1 routes the video data input over the host bus 34 to the vision controller 48A. The vision controller 48A comprises the HD[15:0] bidirectional host port which serves as a data bus connected to the host bus 34. The vision controller 48A also comprises various pins connected to the host bus 34 used in connection with video data input under control of the system sequencer 32. HIRQIN# is an input pin of the vision controller 48A connected to the host bus 34, that is active logic low (logic 0) and provides an interrupt request from the system sequencer 32 to the vision controller 48A to initiate video data reception. HDR is an input pin of the vision controller 48A connected to the host bus 34, on which appears a serial data reception signal. As described earlier, HSCLK is a bidirectional pin of the vision controller 48A connected to the host bus 34, which provides a serial clock signal. HRFS is a bidirectional pin of the vision controller 48A connected to the host bus 34, on which appears a receive video frame synchronization signal. In the case in which the received video data input is Huffman encoded, the vision controller 48A thereafter reads the received video data input from the audio/video data buffer memory 52 via the memory buffer 50 and Huffman decodes the received video data input prior to further decoding and decompression by the vision processor 48B.

An output pixel bus 94 interfaces an RO[7:0] output pixel port of the vision controller 48A for red pixel data, a GO[7:0] output pixel port of the vision controller for green pixel data, and a BO[7:0] output pixel port of the vision controller for blue pixel data to an input of the latch 54. The output pixel bus 94 also connects to various output pins of the vision controller 48A, as follows. CSYNC is an output pin of the vision controller 48A, to which is applied a composite synchronization signal. CBLANK is an output pin on which appears a composite blank signal. An output of the latch 54 interfaces to an input of the LCD driver chip 56A shown in FIG. 1 which converts the RGB encoded pixel blocks to pixel information which is in turn fed to the LCD panel 56B to be displayed.

Additionally, the vision controller 48A comprises an HRDWR input pin connected to the host bus 34 which provides a read/write command, and an HA[2:0] address bus also connected to the host bus. Finally, the vision controller 48A comprises a SYSCK input pin, on which appears the system clock signal from the system clock incorporated into the system sequencer 32 shown in FIG. 1, and a RESET input pin used for vision controller reset.

As shown in FIGS. 1 and 3, the vision controller 48A is used to interface the CCD camera 44, the audio/video data buffer memory 52, and the LCD 56 to the vision processor 48B, since most general purpose microprocessors are not capable of managing the data flow to the vision processor in real time. The vision controller 48A interfaces directly to the vision processor 48B with no external logic.

The flow of data for motion video requires that intraframes, hereafter referred to as "I-frames," are maintained in the audio/video data buffer memory 52 in order to generate interframes (predictive frames), hereafter referred to as "P-frames." The vision controller 48A contains high-speed data-routing logic which, in combination with the on-board RISC microcontroller, manages the flow of data for CCITT H.261 standard compression and decompression and encoding and decoding using the vision processor 48B. In the exemplary implementation in which the size of the LCD panel 56B is 128×112 pixels, the vision controller 48A in combination with the vision processor 48B can perform compression and decompression and encoding and decoding simultaneously to implement a CCITT H.261 p×64 QCIF codec for a 128×112 pixel format.

The vision processor 48B shown in FIG. 1 is a single-chip, highly parallel, microcode-based digital video signal processor. The vision processor 48B is a 64-bit parallel architecture and a reconfigurable 64-bit ALU. Preferably, a 32-bit data bus width of the vision processor 48B is employed. The vision processor 48B preferably operates at a 33 MHz clock frequency. Microcode is stored in an on-chip 4 k instruction word ROM. The vision processor 48B has a fast multiply and accumulate capability. The vision processor 48B is further provided with a shifter and tree adder for CCITT H.261 standard motion estimation.

Video data are transferred to the vision processor 48B through a high-speed DMA port. The vision processor 48B preferably incorporates a DMA data interface with a zero-run/amplitude encoder/decoder.

The vision processor 48B is configured to be controlled by the vision controller 48A. The vision controller 48A is used to handle pixel interface and video data buffer control functions. A command port allows the vision controller 48A to initialize the vision processor 48B, execute microcode subroutines, and control the DMA port.

The vision controller 48A and the vision processor 48B are fed RGB encoded pixel blocks by the CCD chip 44B via the input pixel buffer 46 shown in FIGS. 1 and 3 and process the RGB encoded pixel blocks into blocks of video data that vary in length depending upon the amount of motion detected in the image that is being compressed and encoded. This is reflected in the number of video blocks that must be updated as a result of CCITT H.261 standard motion estimation performed by the vision processor 48B.

The video processor 48B performs CCITT H.261 p×64 QCIF compression in the case of a 128×112 LCD 56 using both I-frames and P-frames. I-frames exploit redundancy within a frame. P-frames achieve a higher degree of compression by exploiting redundancy between frames. The P-frames are derived using a full exhaustive search over a selected pixel motion search range, such as a predetermined plus and minus eight pixel motion estimation search range.

The vision processor 48B determines the content of a P-frame by comparing the last image to the current image transduced and digitized by the CCD camera 44 shown in FIG. 1 and only compressing and encoding differences between the images. The vision processor 48B compares the last image to the current image by analyzing each of the images as if divided into an x-y grid of blocks of pixels, for example, 16×16 blocks of pixels hereafter referred to as "macroblocks." The vision processor 48B compares these macroblocks of pixels. Comparison of macroblocks is much faster than comparison of each and every pixel of the current image to each and every corresponding pixel of the preceding image. This comparison procedure constitutes the motion estimation mentioned earlier. The vision processor 48B performs motion estimation of corresponding macroblocks in parallel, thereby increasing the rate at which changed macroblocks can be identified. The pixels that have changed within the macroblocks that are identified as having changed pixel content are then fully compressed and encoded as P-frames for transmission. The vision processor 48B also performs the inverse operation of video data decoding and decompression.

Typically, for a compression and encode operation, YUV macroblocks are loaded by the vision controller 48A shown in FIGS. 1 and 3 into internal memory of the vision processor 48B a block at a time. In response to a command from the vision controller 48A, the vision processor 48B executes discrete cosine transform (DCT), quantization, differential encoding, zig-zag encoding, and variable length encoding operations. The resulting coefficients are stored in the internal memory of the vision processor 48B. These coefficients are then zero-run/amplitude encoded as the vision controller 48A reads these coefficients. This process is repeated for all YUV macroblocks. Decode and decompression operations follow the above-described data flow in reverse.

Because the vision processor 48B is a microcode-based engine, the vision processor can execute all of the CCITT H.261 standard QCIF p×64 video compression and decompression and encoding and decoding algorithms. The vision processor 48B executes all of the stages of these algorithms from YUV macroblocks to zero-run/amplitude tokens for compression and encoding, and from zero-run/amplitude tokens to YUV macroblocks for decoding and decompression. Compression and decompression and encoding and decoding functions performed by the vision processor 48B include forward and inverse discrete cosine transform, quantization and inverse quantization, differential encode and decode, zig-zag encode and decode, variable length encode and decode, zero-run/amplitude encode and decode, motion estimation and compensation, and filtering. Microcode for executing these CCITT H.261 standard algorithms is supplied with the vision processor 48B. Algorithm parameters, such as quantization values, are fully programmable.

Considered in more detail, a block diagram of the vision processor 48B is shown in FIG. 5. The vision processor 48B contains three internal memory areas, namely, a DPCM memory 100, a DP memory 102, and a register file 104. The DPCM and DP memories 100 and 102 are accessible both internally by the microcode engine and externally through a DMA port 106. The register file 104 is only accessible internally. The DMA port 106 contains an I/O state machine which operates separately from the microcode engine. External data transfers can therefore occur simultaneously with engine computations. Both the microcode engine and the I/O state machine are controlled by commands written through a command port 108. The following is a description for the input and output pins of the vision processor 48B shown in FIG. 5.

DBUS[31:0] is a general purpose I/O data bus connected to the DMA port 106 of the vision processor 48B. This data bus allows input and output of YUV macroblocks, zero-run/amplitude tokens, quantization values, motion vectors, variances, and other data to and from the vision processor 48B. When the vision processor 48B is in "load" mode, data from an IBUS is transferred to and from the DBUS transparently.

CS1# is an input pin connected to the DMA port 106 of the vision processor 48B, that is active low (logic 0). A logic low from the vision controller 48A shown in FIGS. 1 and 3 selects the vision processor 48B for data transfer across the DBUS.

OED# is an input pin connected to the DMA port 106 of the vision processor 48B, that is active low (logic 0). This input pin serves as an output enable for the DBUS and is negative true. A logic low, together with CS1# and READ correctly asserted, enables the DBUS outputs. Otherwise, the DBUS outputs are tristated.

DATVAL# is an input pin connected to the DMA port 106 of the vision processor 48B, that is active low (logic 0). A logic low on this input pin together with a logic low on CS1# during writes by the vision controller 48A shown in FIGS. 1 and 3 indicates to the vision processor 48B that the DBUS contains valid data. A logic low on DATVAL# together with a logic low on CS1# during reads by the vision controller 48A latches data into the DBUS output registers.

READ is an input pin connected to the DMA port 106 of the vision processor 48B. An active high (logic 1) on this input pin indicates a read from the vision processor 48B, and a logic low (logic 0) on this input pin indicates a write to the vision processor 48B. A signal is therefore asserted on READ during DBUS accesses.

BREAK# is an input pin connected to the DMA port 106 of the vision processor 48B, that is active low (logic 0). A logic low on this input pin forces a "step to next line" during raster block data transfers to the DPCM memory 100.

ENDIO# is an input pin connected to the DMA port 106 of the vision processor 48B, that is active low (logic 0). A logic low on this input pin provides an end of I/O indication. That is, a logic low for a period of one cycle indicates to the vision processor 48B the last cycle of a DMA read or write from/to the DPCM and DP memories 100 and 102.

CLK is an input pin of the vision processor 48B, that provides an input clock to the vision processor. The clock signal applied to this input pin has a 50% duty cycle. The clock signal applied to CLK is used directly by the vision processor 48B, undivided.

RST is an input pin of the vision processor 48B, which serves as a reset pin. During normal operation of the vision processor 48B, a logic low (logic 0) appears at this input pin. If the signal which appears at RST transitions to a logic high (logic 1) for at least ten clock cycles, the vision processor 48B enters a reset condition. In the reset condition, all internal state machines are reset, and an instruction sequencer 110 enters an idle state.

STAT[4:0] comprises a status bus for the vision processor 48B. Applying an external pull-up (logic high) to the STAT [1] pin allows the vision controller 48A shown in FIGS. 1 and 3 to determine if a vision processor 48B exists, as, after reset (that is, after a logic high appears at RST), STAT[1] is reset to a logic low (logic 0). The status signals STAT[4:0] are set by the vision processor 48B coincident with the clock rising edge. The enabling of these tristate outputs is controlled through an OES# input pin. The status pins provide the following indications: STAT[4] indicates that the data path is busy; STAT[3] indicates that the vision processor 48B is conditioned to receive/transmit; STAT[2] indicates that the I/O state machine is busy; a logic low on both STAT[1] and STAT[0] indicates that the command queue 112 is nearly empty (one location is occupied); a logic low on STAT[1] and a logic high on STAT[0] indicate that the command queue is empty; a logic high on STAT[1] and a logic low on STAT[0] indicate that the command queue is nearly full (one location is free); and a logic high on both STAT[1] and STAT[0] indicates that the command queue is full.

OES# is an input pin of the vision processor 48B, which is active low (logic 0). A logic low on this input pin enables the STAT bus output and is negative true. That is, a logic low applied to this input pin enables STAT outputs. Otherwise, the STAT bus output pins are tristated.

LOAD# is an input pin connected to the DMA port 106 and to the command port 108 of the vision processor 48B, that is active low (logic 0). A logic low at this input pin together with CS0# asserted enables the "load" mode. Microcode can be loaded into the boot ROM and data storage 48C shown in FIGS. 1 and 3 by setting data on the DBUS and an address on the CBUS and cycling CMD-VAL#.

IBUS[31:0] comprises an I/O bus connected to a microcode ROM 114 of the vision processor 48B. Microcode instructions are transferred over this bus. During normal operation, the IBUS is an input bus. However, in the "load" mode, data can be output on the IBUS to be written into the boot ROM and data storage 48C shown in FIGS. 1 and 3.

ADBUS[13:0] is an output bus connected to the instruction sequencer 110 of the vision processor 48B. This bus is a 14-bit microcode address bus, which allows up to 16 k 32-bit SRAM locations to be addressed.

CBUS[15:0] is an input bus connected to the command port 108 of the vision processor 48B. Commands are written to the vision processor 48B over this bus. When the vision processor 48B is in the "load" mode, the CBUS latches the address present on its lower 12 bits and transfers this address to the ADBUS on assertion of CMDVAL#.

CSO# is an input pin connected to the command port 108 of the vision processor 48B, that is active low (logic 0). A logic low from the vision controller 48A shown in FIGS. 1 and 3 selects the vision processor 48B for a command write over the CBUS.

Finally, CMDVAL# is an input pin connected to the command port 108 of the vision processor 48B, that is active low (logic 0). A logic low at this input pin together with a logic low at the CS0# input pin indicate that the CBUS contains a valid command and should be latched.

The command port 108 of the vision processor 48B is used to issue various commands to the vision processor. The most significant commands are initialize, call microcode routine, write/read data to/from RISC registers 116, write/read data to/from the DPCM and DP memories 100 and 102, write/read coded I-frame video data, and write/read coded P-frame video data. The type of command is indicated by the upper four or five bits depending upon the command that is being written. For the microcode call command, the bottom 12 bits indicate the microcode address at which to begin execution. For the write/read commands to the DPCM and DP memories 100 and 102, the bottom 11 bits, which address 16-bit word locations, indicate the address at which data is to be transferred.

Commands are written to the vision processor 48B by placing the desired command on the CBUS, asserting CS0#, and strobing the CMDVAL# input pin coincident with a single rising clock edge. The commands enter the command queue 112 internal to the vision processor 48B, which allows as many as four commands to be pending. All commands, with the exception of initialization commands, are passed through the command queue 112 before they are executed.

An initialization command is employed to determine whether the vision processor 48B executes instructions from the internal microcode ROM 114 and/or the boot ROM and data storage 48C shown in FIGS. 1 and 3. The default is the boot ROM and data storage 48C.

The bulk of video signal processing microcode for the videophone 10 in accordance with the invention is preferably stored in SRAM in the boot ROM and data storage 48C shown in FIGS. 1 and 3. This SRAM can be read and written by the vision processor 48B using the DBUS and the CBUS. The LOAD# signal must be a logic low (logic 0) during microcode transfers from/to the SRAM. For each transfer, the SRAM address is first written to the CBUS, and then the data are read or written on the DBUS. Timing for the CBUS and the DBUS transfers is exactly as for other command or data transfers. The vision controller 48A shown in FIGS. 1 and 3 provides the output enable and write enable signals to the SRAM.

The vision processor 48B can transfer data between the DBUS and the DPCM and DP memories 100 and 102 either without modification or with zero-run/amplitude encoding or decoding. Data transfers are initiated by writing a command to the CBUS. This command specifies the type of modification, if any, required during transfer and the internal memory address to/from which the transfer is to occur. When the command reaches the top of the command queue 112, the command is executed, and the DBUS is conditioned to transfer the data. The transfer is performed by external logic which properly conditions the CSO# and READ signals and strobes transfers employing the DATVAL# signal. The completion of a data transfer must be indicated to the vision processor 48B so that the internal I/O state machine can be reset. This is accomplished by strobing the ENDIO# input pin after the last transfer has occurred.

The DBUS can operate in either a 32- or a 16-bit mode. The default mode after reset is the 32-bit mode and is preferably employed in connection with the videophone 10 in accordance with the invention for optimum video signal processing. However, by providing an initialization command, the DBUS can be reconfigured to be a 16-bit bus with data transferred only on the least significant 16 bits. Throughput can be the same in both cases, because video data can be transferred only every two cycles in the 32-bit mode or every cycle in the 16-bit mode. The two-cycle pattern of the 32-bit mode applies to the timing of the ENDIO# and BREAK# signals, as well as the DATVAL# signal.

In the case of a 32-bit data write cycle, DATVAL# must be a logic low (logic 0) for only a single rising clock edge per transfer and must transition to a logic high (logic 1) between successive cycles. The BREAK# input pin is strobed on a second transfer, which forces a third transfer to be stored at the beginning of the internal memory line. The ENDIO# input pin is strobed at least two cycles after the last data transfer. CS1# must be valid during ENDIO#.

Insofar as a 32-bit data read cycle is concerned, the OED# signal is employed to enable the DBUS tristate output drivers. CS1# and READ must be correctly asserted before OED# is enabled. DATVAL# is employed to strobe data onto the DBUS. As in the case of the data write cycle, the data read cycle must be at least two clock cycles in duration, with DATVAL# transitioning to a logic high (logic 1) for at least one rising clock edge. For further detail, see "PRELIMINARY DATA SHEET, IIT-VP," Integrated Information Technology, Inc., 1991, the disclosure of which is hereby incorporated herein by this reference in its entirety.

During compression and encoding, the vision controller 48A shown in FIGS. 1 and 3 reads the contents of the input pixel buffer 46 containing uncompressed and uncoded RGB encoded pixel blocks, converts from RGB encoded pixel blocks to YUV macroblocks, and writes the YUV macroblocks to the vision processor 48B shown in FIGS. 1 and 5. The vision controller 48A also reads the appropriate search range and the previous macroblocks from the audio/video data buffer memory 52 via the memory buffer 50 and writes them to the vision processor 48B for motion estimation to produce P-frames. The vision processor 48B compares current frame macroblocks with previous frame macroblocks, which serve as reference frames, within a fixed search range, for example, plus and minus eight pixels centered on the position of the current macroblock. The vision processor 48B then finds the reference macroblock that provides the closest match to the current macroblock and employs the best matched and reference macroblocks and motion vectors produced during motion estimation in connection with quantization. The vision processor 48B determines the quantization step size and output frame rate that provides the best picture quality without overflowing or underflowing the DP memory 102 shown in FIG. 5.

The vision processor 48B shown in FIGS. 1 and 5 operates on the 16×16 pixel blocks that comprise a macroblock by performing functions such as DCT, quantization, differential encoding, zig-zag encoding, and variable length encoding in the case of compression and encoding. Zig-zag scanned transform coefficients, together with information such as picture, group, and macroblock numbers and motion vectors, are also compressed by the vision processor 48B.

The vision processor 48B writes compressed and partially encoded video data to the zero-run/amplitude encoder which produces a compressed and encoded stream of video blocks to the vision controller 48A shown in FIGS. 1 and 3 that complies with the syntax requirements of the CCITT H.261 specification. In the case of compression and encoding, the vision controller 48A writes the reconstructed macroblock that is produced by the vision processor 48B to the audio/video data buffer memory 52 via the memory buffer 50 shown in FIGS. 1 and 3 to serve as a reference for succeeding frames, and the vision controller also stores the I-frame and P-frame video data in the audio/video data buffer memory. If the amount of used audio/video data buffer memory 52 reaches a predetermined level, which signifies that there is significant or rapid movement in the image being transduced by the CCD camera 44 shown in FIG. 1, the audio/video data buffer memory is preferably overwritten with new video data to effectuate the jump ahead method in accordance with the invention.

During decoding and decompression, the vision controller 48A shown in FIGS. 1 and 3 writes compressed and encoded video data input to the video processor 48B shown in FIGS. 1 and 5. Decoding and decompression operations follow the inverse of the above-described data flow. That is, the vision processor 48B performs zero-run/amplitude decoding, variable length decoding, zig-zag decoding, differential decoding, inverse quantization, and inverse discrete cosine transform (IDCT) in the case of decoding and decompression.

The vision processor 48B shown in FIGS. 1 and 5 operates with a 440-cycle count for performing CCITT H.261 macroblock compression and decompression and encoding and decoding. This requires 13.33 microseconds using the 33 MHz vision processor 48B. This corresponds to a total of 160,000 pixels being compressed and encoded or decoded and decompressed at 30 frames per second. Therefore, the vision processor 48B possesses the capability to process blocks of video data faster than the processed video data can be communicated over the standard telephone line 12.

In order to facilitate an understanding of the operation of the videophone in accordance with the invention, operation will now be described in connection with the block diagram shown in FIG. 6 and the flow chart shown in FIGS. 7A and 7B. FIG. 6 constitutes a modification of FIG. 1 and illustrates the elements of the videophone 10 shown in FIG. 1 at a local station used for transmission and reception of audio and video data and expands FIG. 1 to provide a control console 58 having a first output connected to an input of the amplifier 28 and a second output connected to an input of the system sequencer 32 and used by a person to operate the videophone 10 and further expands FIG. 1 to also illustrate the elements of an identical videophone 10' at a remote station used for reception and transmission of audio and video data. As shown in FIG. 6, the elements of the local videophone 10 are identified by unprimed numerals, and the corresponding elements of the remote videophone 10' are identified by primed numerals.

The following describes one portion of bidirectional (full duplex) audio and video communication, namely, transmission 116 from the local videophone 10 and associated reception 118 by the remote videophone 10'. Analogous operation occurs in connection with the other portion of the bidirectional (full duplex) transmission, that is, from the remote videophone 10' to the local videophone 10, in which case the operation of the videophones 10 and 10' shown in FIG. 6 is reversed.

Referring to FIG. 6, the local videophone 10 is connected to the standard bidirectional (full duplex) telephone line 12 comprising a twisted pair. The remote videophone 10' is also connected to the standard telephone line 12.

In a typical operation, a person at the local station initiates a call using the local videophone 10 by dialing the telephone number of the remote videophone 10'. For example, this can be accomplished by the person at the local videophone 10 using a conventional telephone keypad 120 shown in FIG. 8A. Upon hearing the videophone 10' ring, a person at the remote station can answer by picking up an attached handset 122' corresponding to an attached handset 122 shown in FIG. 8A. Alternatively, the person at the remote videophone 10' can answer by pressing a speakerphone activation button 124' corresponding to a speakerphone activation button 124 shown in FIG. 8A.

If the person at the local station desires to transmit video with audio, he or she depresses a video activation button 126 labeled "VIDEO" in FIG. 8A, thereby enabling the CCD camera 44 and the LCD 56 shown in FIG. 6 to operate, while assuring that an attached mechanical shutter 128 shown in FIGS. 8B1 and 8B2 preferably located above the CCD camera lens 44A is in an open position. If the person at the remote station desires to receive video with audio, he or she also depresses the "VIDEO" button 126' corresponding to the "VIDEO" button 126 shown in FIG. 8A, thereby enabling the CCD camera 44' and the LCD 56' shown in FIG. 6 to operate, while assuring that the mechanical shutter 128' corresponding to the mechanical shutter 128 shown in FIGS. 8B1 and 8B2 is in the open position if the person at the remote station also desires to transmit video with audio.

The person at the local station can press a local viewing button 130 labeled "MONITOR" in FIG. 8A to view on the LCD panel 56B shown in FIG. 8B1 the image that the local videophone 10 shown in FIG. 6 is transmitting. The "MONITOR" button 130 is preferably located adjacent to the "VIDEO" button 126.

As shown in FIG. 8B1, a housing 131 for the CCD camera lens 44A and the LCD panel 56B can be swiveled, as indicated by the double headed arrows, to rotatably position the CCD camera lens and the LCD panel. Also, the housing 131 for the CCD camera lens 44A and the LCD panel 56B can be tilted, as indicated by the double headed arrow shown in FIG. 8B2, to set the angle of the CCD camera lens and the LCD panel. Therefore, the person can swivel and tilt the housing 131 to obtain the desired field of view of the CCD camera lens 44A and, consequently, the image that is transmitted to the remote videophone 10' shown in FIG. 6.

The person at the local station can also manually focus the CCD camera 44 shown in FIG. 6 by depressing a camera focusing button 132 labeled "FOCUS" in FIG. 8A preferably located adjacent to the "MONITOR" button 130. A contrast adjustment button 134 labeled "CONTRAST" in FIG. 8A is also preferably provided adjacent to the "FOCUS" button 132 so that the person at the local station can adjust the contrast of the image displayed on the LCD panel 56B shown in FIG. 8B1.

When both "VIDEO" buttons 126 and 126' are pressed, the local videophone 10 and the remote videophone 10' shown in FIG. 6 preferably exchange an initializing handshake via the standard telephone line 12. This handshake is in the form of an initialization frame containing frame alignment, bit rate allocation, type of device, encryption, and other information which can be followed by initial audio and video data. Then, a multi-frame sequence commences, in which each multi-frame is in the form of audio, video, and overhead data preferably formatted based on the CCITT H.221 specification, including the proposed low bandwidth CCITT H.221 modifications relating to transmission of multi-frames at rates as low as 19.2 kbps.

After the initialization procedure between the local videophone 10 and the remote videophone 10' is complete, the following operation occurs in connection with transmission 116 by the videophone 10 and reception 118 by the videophone 10'. Typically, transmission 116 and reception 118 occur synchronously. This is in contrast to the store and forward mode in accordance with the invention, in which either the person at the local station or the person at the remote station, or both, desires to transmit only stored video data and any associated audio data, at which time the stored video data and any associated audio data are preferably transmitted on demand, as will be described later.

In the case of transmission 116, the local videophone 10 initializes an index, as indicated by the numeral 188 shown in FIG. 7A, and initiates the ADC 22 shown in FIG. 6 to digitize analog audio signals transduced by the microphone 20, as indicated by the numeral 190 shown in FIG. 7A. The ADC 22 feeds a stream of digitized sound blocks to the digital audio signal processor 24, as indicated by the numeral 192 shown in FIG. 7A.

At the same time, the local videophone 10 increments the index, as indicated by the numeral 194 shown in FIG. 7A, and then determines whether or not the incremented index has a predetermined value, as indicated by the numeral 196 shown in FIG. 7A. If the incremented index has the predetermined value, as determined at the step 196 shown in FIG. 7A, the local videophone 10 sets an I-frame flag, as indicated by the numeral 198 shown in FIG. 7A. Then, the local videophone 10, upon detecting the "VIDEO" button 126 shown in FIG. 8A being pressed, initiates the CCD camera 44 shown in FIG. 6 so that the CCD chip 44B transduces and digitizes images in the field of view of the attached CCD camera lens 44A, as indicated by the numeral 200 shown in FIG. 7A. As indicated by the numeral 202 shown in FIG. 7A, the CCD chip 44B in turn feeds a stream of RGB encoded pixel blocks to the input pixel buffer 46 shown in FIG. 6.

The digital audio signal processor 24, on the one hand, and the vision controller 48A and the vision processor 48B, on the other hand, next simultaneously process, compress, and encode the respective incoming digitized sound blocks and RGB encoded pixel blocks into blocks of audio data and blocks of video data, respectively. The digital audio signal processor 24 compresses and encodes the digitized sound blocks into audio blocks, as indicated by the numeral 204 shown in FIG. 7A. The digital audio signal processor 24 then writes the audio blocks to the audio/video data buffer memory 52 over the host bus 34, as indicated by the numeral 206 shown in FIG. 7B. These audio blocks are subsequently read from the audio/video data buffer memory 52 over the host bus 34 by the system sequencer 32 which bundles the audio blocks with associated video blocks and formats them with overhead data to form CCITT H.221 compatible frames for combination into multi-frame sequences for transmission, as will be described later. Operation of the vision controller 48A and the vision processor 48B to produce the video blocks that the system sequencer 32 bundles with the associated audio blocks to be formatted with overhead data into CCITT H.221 compatible frames for the multi-frame sequences will now be described in more detail.

The vision controller 48A and the vision processor 48B prepare video blocks to be read and bundled with audio data and formatted with overhead data by the system sequencer 32 for CCITT H.221 compatible transmission. The RGB encoded pixel blocks are read from the input pixel buffer 46 into an input port of the vision controller 48A shown in FIG. 6, as indicated by the numeral 208 shown in FIG. 7A. The vision controller 48A then converts the RGB encoded pixel blocks into YUV pixel blocks, as indicated by the numeral 210 shown in FIG. 7A. These YUV pixel blocks are formed into predetermined size macroblocks, for example, 16×16 pixel blocks, as indicated by the numeral 212 shown in FIG. 7A. These macroblocks are sequentially written to the DMA port 106 of the vision processor 48B shown in FIGS. 5 and 6, as indicated by the numeral 214 shown in FIG. 7A. The vision processor 48B stores the macroblocks in the DPCM memory 100 shown in FIG. 5, as indicated by the numeral 216 shown in FIG. 7A, The vision controller 48A then downloads a command to the vision processor 48B to compress and encode the macroblocks stored in the DPCM memory 100, as indicated by the numeral 218 shown in FIG. 7A.

On the one hand, if the I-frame flag is set, as indicated by the numeral 220 shown in FIG. 7A, the vision controller 48A shown in FIG. 6 resets the I-frame flag, as indicated by the numeral 221 shown in FIG. 7A, and then produces an I-frame, as follows. The vision processor 48B shown in FIG. 6 initially performs a conventional DCT of the macroblocks, as indicated by the numeral 222 shown in FIG. 7A. Next, the vision processor 48B performs conventional quantization, as indicated by the numeral 224 shown in FIG. 7A. Then, the vision processor 48B performs conventional differential encoding, as indicated by the numeral 226 shown in FIG. 7A. Next, the vision processor 48B performs conventional zig-zag encoding, as indicated by the numeral 228 shown in FIG. 7A. Finally, the vision processor 48B performs conventional variable length encoding, as indicated by the numeral 230 shown in FIG. 7A. The vision processor 48B then writes the resulting partially encoded video data to the DP memory 102 shown in FIG. 5, as indicated by the numeral 232 shown in FIG. 7A.

On the other hand, if the I-frame flag is not set, as determined at the step 220 shown in FIG. 7A, the vision processor 48B shown in FIG. 6 produces P-frames, as follows. The vision processor 48B initially reads the macroblocks for the previous image, as indicated by the numeral 234 shown in FIG. 7A. Next, the vision processor 48B performs CCITT H.261 standard motion estimation by comparing the macroblocks for the previous image and the macroblocks for the current image and identifying those macroblocks with changes for compression and encoding, as indicated by the numeral 236 shown in FIG. 7A. Thereafter, the vision processor 48B performs the DCT of the identified changed macroblocks, as indicated by the step 222 shown in FIG. 7A, followed by quantization, as indicated by the step 224 shown in FIG. 7A, differential encoding, as indicated by the step 226 shown in FIG. 7A, zig-zag encoding, as indicated by the step 228 shown in FIG. 7A, and, finally, variable length encoding, as indicated by the step 230 shown in FIG. 7A The vision processor 48B then writes the resulting compressed and partially encoded video data to the DP memory 102 shown in FIG. 5, as indicated by the step 232 shown in FIG. 7A.

The vision controller 48A shown in FIG. 6 next downloads a read command to the vision processor 48B, as indicated by the numeral 238 shown in FIG. 7B. In response, the vision processor 48B routes the compressed and partially encoded video data from the DP memory 102 shown in FIG. 5 through the zero-run/amplitude encoder to provide compressed and encoded video blocks at the DMA port 106 of the vision processor, as indicated by the numeral 240 shown in FIG. 7B. The vision controller 48A next reads the video blocks from the DMA port 106 of the vision processor 48B, as indicated by the numeral 242 shown in FIG. 7B. The vision controller 48A then determines whether or not video data can be written via the memory buffer 50 shown in FIG. 6 to the audio/video data buffer memory 52, as indicated by the numeral 244 shown in FIG. 7B.

As described earlier, the vision controller 48A and the vision processor 48B shown in FIG. 6 operate at 30 frames per second. However, the maximum transmission rate of the modem circuit 36 and/or the standard telephone line 12 is lower.

This can eventuate in a problem of too much video data being accumulated in the audio/video data buffer memory 52 shown in FIG. 6, which in turn causes the images reproduced by the LCD 56' shown in FIG. 6 to substantially lag the reproduced sound. Also, the images displayed by the LCD panel 56B' become blurred and fuzzy in the areas where the P-frame changed macroblocks are being updated. In the case of transmission 116, the local videophone 10 in accordance with the invention addresses the potential unacceptable quality of reproduced images that would otherwise lag the reproduced sound and would appear too blurred and fuzzy in the following ways.

To reduce the amount of video data needed to be transmitted in the multi-frame sequence to produce an updated image displayed on the LCD panel 56B' shown in FIG. 6, the size of the image transduced and digitized by the CCD camera 44 is preferably reduced from the CCITT H.261 p×64 QCIF standard pixel format of 176×144 to a 128×112 pixel format. This decreases the number of macroblocks that must be analyzed and more importantly decreases the amount of compressed and encoded video data that must be bundled with audio data, formatted with overhead data, and transmitted. Furthermore, to substantially reduce both the lag of the reproduced images with respect to the reproduced sound and blurred and fuzzy images of conventional video teleconferencing, the jump ahead method in accordance with the invention intervenes so that the image reproduced by the LCD panel 56B' strobes forward to a more current image based on new I-frame and subsequent P-frame video data.

Generally, the jump ahead method in accordance with the invention causes the vision controller 48A shown in FIG. 6 to monitor the video blocks of I-frame and P-frame video data accumulated in the audio/video data buffer memory 52 queued to be read by the system sequencer 32 for bundling with audio data and formatting with overhead data into multi-frame sequences. The vision controller 48A preferably determines when the accumulated video blocks of I-frame and P-frame video data reach a predetermined level in the audio/video data buffer memory 52, as determined at the step 244 shown in FIG. 7B. On the one hand, if the accumulated video blocks have not reached the predetermined queue level, the vision controller 48A Huffman encodes the compressed and encoded video blocks read from the DMA port 106 of the vision processor 48B shown in FIGS. 5 and 6, as indicated by the numeral 245 shown in FIG. 7B, and writes the resulting video blocks via the memory buffer 50 shown in FIG. 6 to the audio/video data buffer memory 52, as indicated by the numeral 246 shown in FIG. 7B. On the other hand, if the accumulated video blocks have reached the predetermined queue level, as determined at the step 244 shown in FIG. 7B, then the vision controller 48A determines whether or not a dump/overwrite flag is set, as indicated by the numeral 248 shown in FIG. 7B. If the dump/overwrite flag is not set, as determined at the step 248 shown in FIG. 7B, then the video blocks read from the DMA port 106 of the vision processor 48B at the step 242 shown in FIG. 7B are dumped, as indicated by the numeral 250 shown in FIG. 7B, the dump/overwrite flag is set, as indicated by the numeral 252 shown in FIG. 7B, and the index is set to the predetermined value, as indicated by the numeral 254 shown in FIG. 7B. This causes current I-frame video data to be produced.

After the current I-frame video data has been produced, the vision controller 48A shown in FIG. 6 determines at the step 244 shown in FIG. 7B that the accumulated video blocks of I-frame and P-frame video data have reached the predetermined queue level in the audio/video data buffer memory 52 shown in FIG. 6 and also determines that the dump/overwrite flag is set at the step 248 shown in FIG. 7B. Therefore, after the vision controller 48A Huffman encodes the compressed and encoded I-frame video data, as indicated by the numeral 251 shown in FIG. 7B, the vision controller overwrites the video portion of the accumulated video blocks stored in the audio/video data buffer memory 52 with new video blocks of I-frame video data corresponding to the most recently transduced image, as indicated by the numeral 253 shown in FIG. 7B, and resets the dump/overwrite flag, as indicated by the numeral 255 shown in FIG. 7B. Therefore, the video blocks of the most recent I-frame and subsequent P-frame video data are transmitted. This can produce a stroboscopic effect in the image reproduced on the LCD panel 56B' shown in FIG. 6 but results in clearer images being displayed than if the accumulated video blocks of P-frame video data were to be transmitted and reproduced, which would produce blur. Dump/overwrite of the video portion of the audio/video data buffer memory 52 results in video blocks of current I-frame and subsequent P-frame video data being routed to the system sequencer 32 shown in FIG. 6 as normally occurs periodically anyway, for example, at least once every 132 multi-frames in accordance with the CCITT H.261 specification, as indicated by the numeral 256 shown in FIG. 7A.

The system sequencer 32 then sends a read command to the digital audio signal processor 24 and to the vision controller 48A shown in FIG. 6, as indicated by the numeral 258 shown in FIG. 7B. The video blocks and the associated audio blocks are then read from the audio/video data buffer memory 52 under control of the system sequencer 32 over the host bus 34, as indicated by the numeral 260 shown in FIG. 7B.

The system sequencer 32 shown in FIG. 6 then bundles the audio blocks and the video blocks and formats the audio blocks and the video blocks together with overhead data into CCITT H.221 compatible frames and combines these frames into multi-frame sequences. The system sequencer 32 then routes the multi-frame sequences to the modem circuit 36 shown in FIG. 6 for transmission.

In one exemplary implementation of the videophone 10, the modem circuit 36 shown in FIG. 6 is a V.fast modem chip that runs at 19.2 kbps and can therefore only transmit 192 bits per frame at a CCITT H.221 and H.261 standard transmission clock rate of 8 kHz. The system sequencer 32 routes multi-frame sequences to the modem circuit 36 for transmission of the maximum amount of audio and video data that the modem circuit can process, that is, 192 bits per frame in the form of a CCITT H.221 compatible multi-frame sequence. The video data and the audio data are preferably allocated as follows.

As described earlier, the V.fast modem circuit 36 in one exemplary implementation of the videophone 10 can run at 19.2 kbps. Preferably, 14.4 kbps of the 19.2 kbps bandwidth is allocated to video and overhead data (128 bits for video data and 16 bits for overhead data), and 4.8 kbps of the 19.2 kbps bandwidth is allocated to audio data during video and audio communication.

In this regard, the system sequencer 32 instructs the vision controller 48A each clock cycle to feed 128 bits of video data (12.8 kbps) from the audio/video data buffer memory 52. The vision controller 48A reads the video blocks from the audio/video data buffer memory 52 and writes them to the host bus 34 to be read by the system sequencer 32 in 128-bit accesses. The system sequencer 32 also accesses 48 bits of audio data from the audio/video data buffer memory 52 (4.8 kbps), which the system sequencer bundles with the video data. The system sequencer 32 also attaches overhead data (CCITT H.221 standard frame alignment signal (FAS) and bit rate allocation signal (BAS) data) in a service channel (SC) and then transmits 192 bits via the standard telephone line 12 to the modem circuit 36' shown in FIG. 6.

Considered in more detail, as shown in FIG. 9, a standard CCITT H.221 transmission channel frame structure 300 for use at 19.2 kbps is reduced to three sub-channels 302, 304, and 306 of 80 octets each. In the United States of America, the three sub-channels 302, 304, and 306 correspond to CCITT H.221 sub-channels "5," "6," and "7" with CCITT H.221 sub-channel "8" indicated by the numeral 308 shown in FIG. 9 being filled with logic high (logic 1) bits. Alternatively, the sub-channels 304, 306, and 308 corresponding to CCITT sub-channels "6," "7," and "8" without the sub-channel 308 being filled with logic high bits can be employed, for example, in European countries. Each sub-channel 302, 304, 306, and 308 contains 80 bit positions.

In the case where the sub-channels 302, 304, and 306 are employed and sub-channel 308 is filled with logic high bits, the sub-channel 306 comprises the service channel (SC) in which the first 16 bit positions of this sub-channel are reserved for overhead data and are not usable as bit positions for transmitting audio, video, and other data bits. The remaining 224 usable bit positions are numbered left to right across the sub-channels 302 and 304 and then vertically down the sub-channel 306 beginning with one and counting to 224 (80 bits×3 sub-channels minus 16 overhead bits=224 useable bit positions), as shown in FIG. 10.

FIG. 10 represents the usable bit positions for an implementation using a 24 kbps modem chip. For example, audio data can occupy bit positions "1" through "48," and video data can occupy bit positions "49" through "224," together with the first two octets (16 bits) in the sub-channel 306 corresponding to CCITT H.221 sub-channel "7" for FAS and BAS bits.

In contrast, in one exemplary implementation in which the modem circuit 36 shown in FIG. 6 is a 19.2 kbps modem chip, only 192 bits of the available 224 bit positions are used. As shown in FIG. 11, bit positions "A1" through "A48" in the sub-channels 302 and 304 corresponding to CCITT sub-channels "5" and "6" are used for audio data. Bit positions "V1" through "V112" (112 bits) in the sub-channels 302 and 304 corresponding to CCITT H.221 sub-channels "5" and "6" are used for video data to complete these sub-channels. Therefore, all 160 bit positions in the sub-channels 302 and 304 corresponding to CCITT H.221 sub-channels "5" and "6" are occupied. The other 16 bits of the total of 128 bits of video data for the 19.2 kbps implementation reside in bit positions "V113" through "V128" in the sub-channel 306 corresponding to CCITT H.221 sub-channel "7." The first 16 bits in the sub-channel 306 corresponding to CCITT H.221 sub-channel "7" are used for the FAS and BAS bits. The remaining 34 bit positions in the sub-channel 306 corresponding to CCITT H.221 sub-channel "7" are not used at 19.2 kbps, whereas these bit positions are available for use at 24 kbps.

Generally, transmission 116 communicates multi-frame sequences that contain I-frame and P-frame video data formatted with audio data and overhead data. An I-frame consists of compressed and fully encoded video blocks from which can be derived a complete representation of the contents of a video frame, and a P-frame consists of video data that form a representation of video blocks that have changed since the last video frame.

Referring again to FIG. 9, video, audio, and overhead data are combined together by the system sequencer 32 shown in FIG. 6 to form the transmitted multi-frame sequences. Each frame contains overhead data in the form of frame alignment and bit rate allocation information coupled with the I-frame or P-frame video data and audio data based on the CCITT H.221 specification. The multi-frame sequences comprise eight sets of sub-multi-frames consisting of two frames (one even numbered and one odd numbered).

The standard multi-frame sequence comprises eight sub-multi-frames each having two frames each, one even (0) and one odd (1). Therefore, a multi-frame comprises 16 frames. When the frame count reaches sixteen, the system sequencer 32 begins a new multi-frame sequence.

Upon receipt of multi-frame sequences from the system sequencer 32, the modem circuit 36 shown in FIG. 6 preferably processes the incoming bits into V.fast synchronous transmission format and communicates with the modem circuit 36' via the standard telephone line 12. In the case of reception 118, the videophone 10' initially receives overhead data which indicates that the modem circuit 36 has initiated transmission of multi-frame sequences.

Then, the modem circuit 36 transmits the multi-frame sequences via the standard telephone line 12 to the modem circuit 36'. The modem circuit 36' transfers the incoming multi-frame sequences to the system sequencer 32' shown in FIG. 6. The system sequencer 32' receives the incoming multi-frame sequences and unformats and unbundles the video data and the audio data and routes them to the audio/video data buffer memory 52' for access by the vision controller 48A' and the vision processor 48B', on the one hand, and by the digital audio signal processor 24', on the other hand, which decode and decompress and process them back into RGB encoded pixel blocks and digitized sound blocks, respectively. The vision controller 48A' writes the incoming video blocks of I-frame and P-frame video data to the audio/video data buffer memory 52' shown in FIG. 6 under control of the system sequencer 32'.

The digital audio signal processor 24' then transfers the digitized sound blocks to the DAC 26' shown in FIG. 6, which converts the digitized sound blocks to analog audio signals. The DAC 26' then feeds the analog audio signals to the amplifier 28' which in turn feeds the amplified analog audio signals to the electroacoustic transducer 30' shown in FIG. 6 for reproduction of the sound transmitted by the local videophone 10. Preferably, the gain of the amplifier 28' can be adjusted by a volume control 140' corresponding to the volume control 140 shown in FIG. 8A to adjust the volume of the reproduced sound.

At the same time, the vision controller 48A' reads the I-frame and P-frame video data from the audio/video data buffer memory 52' via the memory buffer 50', Huffman decodes the I-frame and P-frame video data, and commands the vision processor 48B' to decode and decompress the I-frame and P-frame video data. In the case of an I-frame, the vision processor 48B' decodes and decompresses the I-frame video data and routes YUV macroblocks to the vision controller 48A which converts the YUV macroblocks to RGB encoded pixel blocks which the vision controller 48A' writes to the latch 54' shown in FIG. 6. In the case of P-frames, the vision processor 48B' decodes and decompresses the P-frame video data and routes YUV macroblocks to the vision controller 48A which converts the YUV macroblocks to RGB encoded pixel blocks as updates to the specified macroblocks of the preceding I-frame video data stored in the audio/video data buffer memory 52' and then routes the RGB encoded pixel blocks to the latch 54'. The latch 54' routes the RGB encoded pixel blocks to the LCD chip 56A' which in turn feeds pixel information to the LCD panel 56B' to update the display for reproduction of the images transmitted by the local videophone 10.

So that the jump ahead method in accordance with the invention can be better understood, the following example is provided. Assume that a call is in progress between a person using the local videophone 10 and a person using the remote videophone 10' shown in FIG. 6.

The CCD camera 44 transduces and digitizes an image at the transmitting station. Next, the vision controller 48A converts each frame (for example, as many as 30 frames per second) into macroblocks. The vision processor 48B selects key macroblocks, such as those corresponding to the features of the face and body of the person, which are moving, while ignoring static background and unchanged macroblocks which are redundant. Only the changed video data, as well as the associated audio data, are transmitted by the modem circuit 36 from the transmitting station to the receiving station where the videophone 10' at the receiving station re-assembles the macroblocks for display, as well as reproduces sound. Accordingly, two to ten frames per second of video data can be transmitted over the standard telephone line 12 depending upon the amount of motion (the more motion, the fewer frames). At the receiving station, the vision controller 48A' and the vision processor 48B' decode and decompress the video data and cause only the changed pixels to be altered on the LCD panel 56B'.

In accordance with the jump ahead image enhancement method of the invention, the remote videophone 10' receives and reproduces multi-frame sequences as fast as the respective V.fast modem circuits 36 and 36' can process and transmit them, which is at a frame rate less than the 30 frames per second at which the respective vision controllers 48A and 48A' and vision processors 48B and 48B' operate. In one exemplary implementation, the respective V.fast modem circuits 36 and 36' run at 19.2 kbps with the audio data being allocated 4.8 kbps and the video and overhead data being allocated the remaining 14.4 kbps for transmission. When the allocated video bandwidth is insufficient due to significant change or rapid motion in the image being transduced at the local videophone 10, the video data becomes too delayed in transmission, and the vision controller 48A performs the video frame jump ahead method in accordance with the invention to compensate for the lack of video bandwidth, as follows.

Assume that there is little movement by the persons at the local and remote stations. Both persons are sitting and casually speaking to each other in rooms that have bare walls. Each person moves his or her lips while talking and might occasionally nod his or her head. The system sequencers 32 and 32' of the respective videophones 10 and 10' continue to format and unformat multi-frame sequences as fast as the respective V.fast modem circuits 36 and 36' can process the multi-frame sequences. The transmission rate would therefore be seven to nine frames per second. The audio data are processed by the respective digital audio signal processors 24 and 24', and the respective vision controllers 48A and 48A' and vision processors 48B and 48B' process the I-frame and P-frame video data. The images displayed by the LCD panels 56B and 56B' of the respective videophones 10 and 10' would be clear.

Now assume that the person at the local videophone 10 is suddenly joined by a group of friends who enter the field of view of the CCD camera lens 44A and greet the person using the remote videophone 10'. The vision processor 48B detects a significant change when motion estimation is performed. Consequently, the number of macroblocks that need to be updated is substantial. Due to the number of macroblocks that change, the transmission rate slows to approximately four frames per second, and the audio/video frame buffer memory 52 begins to accumulate P-frame video data. As a result, the number of bits contained in the video data that must be transmitted to update the image reproduced by the LCD panel 56B' increases dramatically. Therefore, more time is needed to transmit the video data through the multi-frame sequences and then to decode and decompress the video data of the transmitted multi-frame sequences using the vision processor 48B' and display updated images on the LCD panel 56B'.

The vision controller 48A detects that the audio/video frame buffer memory 52 used to store the video blocks queued to be accessed by the system sequencer 32 is almost full or full and preferably overwrites at least some and preferably all of the video blocks that await being accessed by the system sequencer. That is, the vision controller 48A preferably overwrites the most recent I-frame and subsequent P-frame video data to the audio/video frame buffer memory 52 to be accessed by the system sequencer 32. Audio data are preferably transmitted as usual while the jump ahead method in accordance with the invention is performed.

At the remote videophone 10', the person would see a great deal of motion begin to occur as the additional people enter the field of view of the CCD camera lens 44A of the local videophone 10. At this juncture, the image reproduced by the LCD panel 56B' would jump ahead to show some of the additional people already in the field of view. At the time of the next jump ahead, the other people would have moved into the field of view. After the next jump ahead, the whole group would be in the field of view. At the time of the final jump ahead, everyone would appear in the field of view greeting the person. During this brief period, the transmission rate would have varied from two to seven frames per second and would then return to seven to nine frames per second as the amount of motion decreases.

Finally, the videophone 10 in accordance with one embodiment of the invention preferably incorporates a store and forward mode. In operation, without calling the remote videophone 10', the person using the local videophone 10 presses the "MONITOR" button 130 and also presses a video and audio data storage button 136 labeled "RECORD" in FIG. 8A. This enables images to be transduced and digitized by the CCD camera 44 shown in FIG. 6. The digitized images are then compressed and encoded by the video controller 48A and the vision processor 48B, and the resulting compressed and encoded video data are stored in the audio/video data buffer memory 52. Any associated audio data can also be transduced, digitized, compressed, encoded, and stored in the audio/video data buffer memory 52. If the person using the local videophone 10 then presses a playback button 138 labeled "PLAY" in FIG. 8A, the images and any associated sound can be played back at the local videophone 10 by decoding, decompressing, and reproducing the stored video and any associated audio data at the local station. Also, the person at the local station can call the remote videophone 10', and the person at the remote station can press the "VIDEO" button 126' corresponding to the "VIDEO" button 126 shown in FIG. 8A to enable the remote videophone 10' to receive video and any associated audio data. The video and any associated audio data stored at the local videophone 10 can be transmitted to the remote videophone 10' and reproduced under control of the person at the local station by pressing the "PLAY" button 138, thereby enabling stored video and any associated audio data to be transmitted to the remote videophone 10' where the video and any associated audio data can be decoded, decompressed, and reproduced.

As shown in FIG. 8A, the control console 58 also preferably comprises a storage button 142 labeled "SAVE" and a recall button 144 labeled "MEM" to enable multiple samples of video and any associated audio data to be stored and retrieved. The "SAVE" button 142 and the "MEM" button 144 can be the corresponding buttons of a conventional speed dialer, which normally operate in a speed dialer mode, but which operate in the store and forward mode when the "RECORD" button 136 or the "PLAY" button 138 is previously pressed, as follows. A sample can be stored by the person using the local videophone 10 by pressing the "RECORD" button 136 followed by pressing the "SAVE" button 142 followed by pressing one of the buttons shown in FIG. 8A beneath the "SAVE" button and the "MEM" button 144 marked by the person to identify the particular sample. By default, the buttons shown in FIG. 8A beneath the "SAVE" button 142 and the "MEM" button 144 can be numbered, for example. A sample of video and any associated audio data can be played back and/or transmitted by the person at the local videophone 10 by pressing the "PLAY" button 138 and then pressing the "MEM" button 144 and thereafter pressing a selected one of the buttons shown in FIG. 8A beneath the "SAVE" button 142 and the "MEM" button corresponding to the identity of the sample during the above-described store and forward operation.

Additionally, the above-described store and forward mode can be employed in a similar manner to enable video and any associated audio data received by a receiving station to in turn be stored at the receiving station and thereafter played back and/or transmitted to another station under control of the person at the initial receiving station. Similarly, either the person at the initial transmitting station or the person at the initial receiving station, or both, can store excerpts of video and any associated audio data transmitted by the other station during operation. Thereafter, these excerpts can be played back and/or transmitted to yet another station.

It will be understood and appreciated that the embodiments of the present invention described above are susceptible to various modifications, changes, and adaptations. For example, the vision controller 48A and the vision processor 48B of the videophone 10 can be a single chip. Also, other non-emissive flat panel display types being developed, which can be operated in a reflective mode to facilitate a flat profile, and which preferably operate at low power, such as colloidal suspension displays, can be substituted for the LCD 56 of the videophone 10. Furthermore, the keypad 120 shown in FIG. 8A can be used to identify multiple samples of video and any associated audio data to be stored and forwarded, rather than the buttons shown in FIG. 8A beneath the "SAVE" button 142 and the "MEM" button 144. The videophone 10 in accordance with the invention can also be implemented as a peripheral or on a card and installed in a personal computer (PC), in which case the microprocessor and associated memory of the PC would preferably replace the system sequencer 32 and audio/video data buffer memory 52, and the display of the PC could be substituted for the LCD 56. Also, in accordance with the invention, multi-frame sequences containing video, audio, overhead, and other data, such as the output of a computer, a facsimile transmission device, or the live/delayed annotation of one or more screens with text or graphics, can be transmitted as other data in accordance with the CCITT H.221 specification, for example, in bit positions "D1" through "D24" (2.4 kbps), as shown in FIG. 12. When this occurs, a portion of the 14.4 kbps of bandwidth allocated to video data is re-allocated to transmission of these other data. Finally, it is contemplated that the videophone 10 can be operated asynchronously in a unidirectional (half duplex) mode to either transmit or receive multi-frame sequences containing video, audio, overhead, and other data at effective rates exceeding 112 kbps to enable 24 to 30 frame per second video and compact disc quality (16 kbps) audio entertainment, programming, and data retrieval to be provided via a standard telephone line. All is intended to be comprehended within the meaning and range of equivalents of the appended claims.

What is claimed is:

1. Apparatus for communicating audio and video simultaneously via a standard telephone line, comprising:

video camera means for transducing and digitizing images;

video processing means connected to the video camera means for compressing and encoding an initial digitized image to produce video data and storing the video data, the video processing means for detecting a change in a subsequent digitized image with respect to the initial digitized image and for compressing and encoding the change in the digitized image to produce changed video data and storing the changed video data;

means for transducing and digitizing sound that is present when the images are being transduced and digitized;

audio processing means connected to the means for transducing and digitizing sound for compressing and encoding digitized sound into audio data and storing the audio data, operation of the audio processing means being synchronized with operation of the video processing means; and a communication controller connected to the video processing means and the audio processing means for formatting and transmitting the stored audio data bundled with the stored video data via the standard telephone line;

the video processing means for detecting when the amount of video data that is stored reaches a predetermined level such that the amount of changed video data exceeds the capability to transmit the changed video data within a time period allotted for transmission via the standard telephone line to produce a current image;

the video processing means for discontinuing the storage of changed video data when the predetermined level is reached and producing video data for a subsequent current image and storing the subsequent current video data for transmission via the standard telephone line to produce a current image.

2. The apparatus of claim 1 wherein the video processing means overwrites stored video data with video data for the subsequent current image when the predetermined level is reached.

3. The apparatus of claim 1 wherein the communication controller receives audio and video data via the standard telephone line and then unformats and unbundles the audio and video data and wherein the audio processing means and the video processing means decode and decompress the audio and video data, respectively, and further comprising:

means connected to the video processing means for reproducing images based on the decoded and decompressed video data; and electroacoustic transducer means connected to the audio processing means for reproducing sound based on the decoded and decompressed audio data.

4. The apparatus of claim 1 wherein the video camera means is a color charge coupled device (CCD) camera.

5. The apparatus of claim 1, further comprising a mechanical shutter adjacent to the video camera means and selectively actuable by a person to obstruct the video camera means to enable the person to have privacy when privacy is desired.

6. The apparatus of claim 3 wherein the means for reproducing images comprises a color liquid crystal display (LCD).

7. The apparatus of claim 3 wherein the video camera means and the means for reproducing images are mounted in a tiltable swivel housing.

8. The apparatus of claim 1 wherein the video processing means comprises:

an input pixel buffer having an input pixel bus connected to the video camera means and an output;

a vision controller having an input interfaced to the output of the input pixel buffer and first, second, and third bidirectional busses;

a vision processor connected to the first bidirectional bus of the vision controller;

a memory buffer having an input interfaced to the second bidirectional bus of the vision controller and also having a memory interface; and a memory connected to the memory interface of the memory buffer;

the communication controller being interfaced to the third bidirectional bus of the vision controller.

9. The apparatus of claim 1 wherein the audio processing means comprises:

a microphone having an output;

an analog-to-digital converter having an input connected to the output of the microphone and an output; and a digital audio signal processor having an input interfaced to the output of the analog-to-digital converter and also having a bidirectional bus;

the communication controller being interfaced to the bidirectional bus of the digital audio signal processor.

10. The apparatus of claim 8 wherein the audio processing means comprises:

a microphone having an output;

an analog-to-digital converter having an input connected to the output of the microphone and an output; and a digital audio signal processor having an input interfaced to the output of the analog-to-digital converter and also having a bidirectional bus;

the communication controller being interfaced to the bidirectional bus of the digital audio signal processor.

11. The apparatus of claim 1 wherein the communication controller comprises:

a system sequencer having a bidirectional bus interfaced to the video processing means and to the audio processing means and also having a first serial bus;

a modem circuit interfaced to the first serial bus and having a second serial bus; and a line interface connected to the second serial bus and having a serial interconnection to the standard telephone line.

12. A method for communicating audio and video simultaneously via a standard telephone line, comprising the steps of:

transducing and digitizing images;

compressing and encoding an initial digitized image to produce video data and storing the video data;

detecting a change in a subsequent digitized image with respect to the initial digitized image;

compressing and encoding the change in the digitized image to produce changed video data and storing the changed video data;

synchronously transducing and digitizing sound present when the images are being transduced and digitized;

compressing and encoding the digitized sound into audio data and storing the audio data;

formatting and transmitting the stored audio data bundled with the stored video data via the standard telephone line;

detecting when the amount of video data that is stored reaches a predetermined level such that the amount of changed video data exceeds the capability to transmit the changed video data within a time period allotted for transmission via the standard telephone line to produce a current image;

discontinuing the storage of changed video data when the predetermined level is reached; and producing video data for a subsequent current image and storing the subsequent current video data for transmission via the standard telephone line to produce a current image.

13. The method of claim 12 wherein the step of producing video data for the subsequent current image comprises overwriting stored video data with video data for the subsequent current image when the predetermined level is reached.

14. The method of claim 12, further comprising the steps of:

receiving audio and video data via the standard telephone line;

unformatting and unbundling the received audio and video data;

decoding and decompressing the received audio and video data;

reproducing images based on the decoded and decompressed video data; and reproducing sound based on the decoded and decompressed audio data.

15. The method of claim 12 wherein the steps of transducing and digitizing images, compressing and encoding the digitized images into video data, synchronously transducing and digitizing sound present when the images are being transduced and digitized, and compressing and encoding digitized sound into audio data are performed when a first button is pressed;

further comprising the steps of:

storing the video and audio data; and playing back the images and any associated sound by decoding, decompressing, and reproducing the stored video and any associated audio data when a second button is pressed; and wherein the step of formatting and transmitting the audio data bundled with the video data via the standard telephone line is performed when the second and a third button are pressed.

16. A method for communicating audio and video simultaneously via a standard telephone line, comprising the steps of:

provial digitized images;

compressing and encoding the digitized images to produce video data and storing the video data;

providing digitized sound synchronized with the digitized images;

compressing and encoding the digitized sound into audio data and storing the audio data;

formatting and transmitting the stored audio data bundled with the stored video data via the standard telephone line;

detecting when the amount of video data that is stored reaches a predetermined level such that the amount of video data exceeds the capability to transmit the video data within a time period allotted for transmission via the standard telephone line to produce a current image;

discontinuing the storage of video data when the predetermined level is reached; and producing video data for a subsequent current image and storing the subsequent current video data for transmission via the standard telephone line to produce a current image.

17. The method of claim 16 wherein the step of producing video data for the subsequent current image comprises overwriting stored video data with video data for the subsequent current image when the predetermined level is reached.

18. The method of claim 16, further comprising the steps of:

receiving audio and video data via the standard telephone line;

unformatting and unbundling the received audio and video data;

decoding and decompressing the received audio and video data;

reproducing images based on the decoded and decompressed video data; and reproducing sound based on the decoded and decompressed audio data.

19. The method of claim 16 wherein the step of providing digitized images, compressing and encoding the digitized images into video data, providing digitized sound synchronized with the digitized images, and compressing and encoding digitized sound into audio data are performed when a first button is pressed;

further comprising the steps of:

storing the video and audio data; and playing back the images and any associated sound by decoding, decompressing, and reproducing the stored video and any associated audio data when a second button is pressed; and wherein the step of formatting and transmitting the audio data bundled with the video data via the standard telephone line is performed when the second and a third button are pressed.

20. The method of claim 16, further comprising the step of formatting and transmitting other data with the audio and video data via the standard telephone line.

* * * * *